United States Patent
Hartinger et al.

(10) Patent No.: US 10,526,511 B2
(45) Date of Patent: Jan. 7, 2020

(54) CONVERTIBLE PRESSURE SENSITIVE ADHESIVES COMPRISING URETHANE (METH)ACRYLATE OLIGOMERS

(71) Applicant: Avery Dennison Corporation, Glendale, CA (US)

(72) Inventors: Danny G. Hartinger, Centre Hall, PA (US); Michael Zajaczkowski, Bellefonte, PA (US); Michael T. Waterman, Chardon, OH (US); Kyle R. Heimbach, Millmont, PA (US); Eric L. Bartholomew, Mill Hall, PA (US); Brandon S. Miller, Lock Haven, PA (US)

(73) Assignee: Avery Dennison Corporation, Glendale, CA (US)

( * ) Notice: Subject to any disclaimer, the term of this patent is extended or adjusted under 35 U.S.C. 154(b) by 35 days.

(21) Appl. No.: 15/845,326

(22) Filed: Dec. 18, 2017

(65) Prior Publication Data
US 2018/0179422 A1    Jun. 28, 2018

Related U.S. Application Data

(60) Provisional application No. 62/437,775, filed on Dec. 22, 2016.

(51) Int. Cl.
| | | |
|---|---|---|
| C09J 133/10 | (2006.01) | |
| C09J 175/14 | (2006.01) | |
| C08L 63/00 | (2006.01) | |
| C09J 133/08 | (2006.01) | |
| C09J 7/38 | (2018.01) | |
| C08J 3/24 | (2006.01) | |

(52) U.S. Cl.
CPC .............. *C09J 7/387* (2018.01); *C08J 3/246* (2013.01); *C08L 63/00* (2013.01); *C09J 7/385* (2018.01); *C09J 133/08* (2013.01); *C09J 133/10* (2013.01); *C09J 175/14* (2013.01); *C08F 2500/01* (2013.01)

(58) Field of Classification Search
CPC ..... C09J 7/387; C09J 7/385; C09J 4/06; C09J 133/04; C09J 133/08; C09J 133/10; C09J 175/14; C08F 265/04; C08F 2500/01; C08J 3/246; C08L 63/00
USPC ........................................................ 525/165
See application file for complete search history.

(56) References Cited

U.S. PATENT DOCUMENTS

| | | |
|---|---|---|
| 3,408,008 A | 10/1968 | Cocks |
| 3,619,270 A | 11/1971 | Tesch |
| 3,639,500 A | 2/1972 | Muny et al. |
| 4,002,601 A | 1/1977 | Hajek et al. |
| 4,049,483 A | 9/1977 | Loder et al. |
| 4,135,033 A | 1/1979 | Lawton |
| 4,143,858 A | 3/1979 | Schmidt, III et al. |
| 4,145,511 A | 3/1979 | Gilles |
| 4,145,514 A | 3/1979 | Devry et al. |
| 4,217,434 A | 8/1980 | Koeble |
| 4,590,230 A | 5/1986 | Kamada et al. |
| 4,713,273 A | 12/1987 | Freedman |
| 4,756,968 A | 7/1988 | Ebe et al. |
| 4,914,253 A | 4/1990 | Chang |
| 5,001,173 A | 3/1991 | Anderson et al. |
| 5,024,880 A | 6/1991 | Veasley et al. |
| 5,189,176 A | 2/1993 | Blum et al. |
| 5,194,486 A | 6/1993 | Levine et al. |
| 5,252,694 A | 10/1993 | Willett et al. |
| 5,264,532 A | 11/1993 | Bernard |
| 5,348,589 A | 9/1994 | Arai et al. |
| 5,348,780 A | 9/1994 | Boggs et al. |
| 5,389,704 A | 2/1995 | Yabu |
| 5,462,797 A | 10/1995 | Williams et al. |
| 5,468,652 A | 11/1995 | Gee |
| 5,593,759 A | 1/1997 | Vargas et al. |
| 5,625,006 A | 4/1997 | Callahan, Jr. et al. |
| 5,645,764 A | 7/1997 | Angelopoulos et al. |
| 5,695,837 A | 12/1997 | Everaerts et al. |
| 5,721,289 A | 2/1998 | Karim et al. |
| 5,800,724 A | 9/1998 | Habeger et al. |
| 5,905,099 A | 5/1999 | Everaerts et al. |
| 5,907,018 A | 5/1999 | Mazurek et al. |
| 5,951,786 A | 9/1999 | Gee et al. |
| 5,955,512 A | 9/1999 | Numazawa et al. |
| 6,011,307 A | 1/2000 | Jiang et al. |
| 6,040,048 A | 3/2000 | Kato et al. |
| 6,077,527 A | 6/2000 | Tan et al. |
| 6,106,982 A | 8/2000 | Mientus et al. |
| 6,204,350 B1 | 3/2001 | Liu et al. |
| 6,228,486 B1 | 5/2001 | Kittel et al. |

(Continued)

FOREIGN PATENT DOCUMENTS

| | | |
|---|---|---|
| CN | 1330686 | 1/2002 |
| CN | 101000899 | 7/2007 |

(Continued)

OTHER PUBLICATIONS

Shen, F.-S. et al., "Irradiation of Chemically Crosslinked Ultrahigh Molecular Weight Polyethylene", J. Polymer Sci.: Part B: Polymer Phys. 34: 1063-1077 (1996).

(Continued)

*Primary Examiner* — William K Cheung

(57) ABSTRACT

Pressure sensitive adhesives which can be converted to form structural adhesives are described. The pressure sensitive adhesives include a blend of acrylic PSA resins in combination with one or more particular urethane (meth)acrylate oligomers.

66 Claims, No Drawings

(56) References Cited

U.S. PATENT DOCUMENTS

| | | |
|---|---|---|
| 6,235,850 B1 | 5/2001 | Perez et al. |
| 6,319,979 B1 | 11/2001 | Dubois et al. |
| 6,344,515 B1 | 2/2002 | Parikh et al. |
| 6,353,037 B1 | 3/2002 | Thunhorst et al. |
| 6,362,249 B2 | 3/2002 | Chawla |
| 6,391,415 B1 | 5/2002 | McCurry et al. |
| 6,472,065 B1 | 10/2002 | Alahapperuma et al. |
| 6,489,392 B1 | 12/2002 | Lappalainen et al. |
| 6,497,949 B1 | 12/2002 | Hyde et al. |
| 6,541,872 B1 | 4/2003 | Schrock et al. |
| 6,613,857 B1 | 9/2003 | Koch et al. |
| 6,641,911 B1 | 11/2003 | Puerkner et al. |
| 6,653,408 B1 | 11/2003 | St. Clair |
| 6,664,318 B1 | 12/2003 | Bymark et al. |
| 6,770,164 B1 | 5/2004 | Schrock et al. |
| 6,756,095 B2 | 6/2004 | Sandt et al. |
| 6,790,903 B1 | 9/2004 | Majolo et al. |
| 6,844,391 B1 | 1/2005 | Iyer et al. |
| 6,852,801 B1 | 2/2005 | Briggs et al. |
| 6,866,919 B2 | 3/2005 | Ikeguchi et al. |
| 7,088,248 B2 | 8/2006 | Forster |
| 7,144,751 B2 | 12/2006 | Gee et al. |
| 7,166,649 B2 | 1/2007 | Day et al. |
| 7,212,127 B2 | 5/2007 | Jacober et al. |
| 7,225,992 B2 | 6/2007 | Forster |
| 7,247,659 B2 | 7/2007 | Kura et al. |
| 7,268,173 B2 | 9/2007 | Graichen et al. |
| 7,298,266 B2 | 11/2007 | Forster |
| 7,465,493 B2 | 12/2008 | Lu |
| 7,514,528 B2 | 4/2009 | Kauffman et al. |
| 7,517,579 B2 | 4/2009 | Campbell et al. |
| 7,524,911 B2 | 4/2009 | Karjala et al. |
| 7,575,653 B2 | 8/2009 | Johnson et al. |
| 7,641,966 B2 | 1/2010 | Hashimoto et al. |
| 7,687,551 B2 | 3/2010 | Mgaya et al. |
| 7,691,437 B2 | 4/2010 | Ellis et al. |
| 7,703,687 B2 | 4/2010 | Barczyk et al. |
| 7,786,868 B2 | 8/2010 | Forster |
| 7,875,500 B2 | 1/2011 | Inada et al. |
| 7,935,424 B2 | 5/2011 | Maeda et al. |
| 7,968,194 B2 | 6/2011 | Inada et al. |
| 7,968,195 B2 | 6/2011 | Inada et al. |
| 7,989,543 B2 | 8/2011 | Karjala et al. |
| 8,068,028 B2 | 11/2011 | Phaneuf |
| 8,080,177 B2 | 12/2011 | Long et al. |
| 8,148,451 B2 | 4/2012 | Fenn et al. |
| 8,168,035 B2 | 5/2012 | Uesugi et al. |
| 8,179,198 B2 | 5/2012 | Das et al. |
| 8,222,339 B2 | 7/2012 | Valvac et al. |
| 8,242,185 B2 | 8/2012 | Smith et al. |
| 8,287,949 B2 | 10/2012 | Maak et al. |
| 8,289,165 B2 | 10/2012 | Forster |
| 8,389,596 B2 | 3/2013 | Boyce et al. |
| 8,593,256 B2 | 11/2013 | Isabell |
| 8,617,930 B2 | 12/2013 | Inada et al. |
| 8,734,939 B2 | 5/2014 | Herr et al. |
| 9,023,954 B1 | 5/2015 | Wright |
| 9,040,155 B2 | 5/2015 | Ha et al. |
| 9,062,140 B2 | 6/2015 | Fujimaru et al. |
| 9,074,087 B2 | 7/2015 | Chen et al. |
| 9,181,365 B2 | 11/2015 | Malofsky et al. |
| 9,216,434 B2 | 12/2015 | Xiao et al. |
| 9,234,067 B2 | 1/2016 | Hayes et al. |
| 9,359,528 B2 | 6/2016 | Yoon et al. |
| 9,382,461 B2 | 7/2016 | Boyce et al. |
| 9,708,509 B2 | 7/2017 | Zajaczkowski et al. |
| 9,714,365 B2 | 7/2017 | Zajaczkowski et al. |
| 9,725,623 B2 | 8/2017 | Zajaczkowski et al. |
| 9,738,817 B2 | 8/2017 | Zajaczkowski et al. |
| 9,780,509 B2 | 10/2017 | Chin |
| 10,035,930 B2 | 7/2018 | Zajaczkowski et al. |
| 10,040,973 B2 | 8/2018 | Zajaczkowski et al. |
| 10,040,974 B2 | 8/2018 | Zajaczkowski et al. |
| 10,040,978 B2 | 8/2018 | Zajaczkowski et al. |
| 2002/0028326 A1 | 3/2002 | Lhila et al. |
| 2002/0185222 A1 | 12/2002 | Wigdorski et al. |
| 2003/0069323 A1 | 4/2003 | Varlemann et al. |
| 2004/0058133 A1 | 3/2004 | Bilodeau |
| 2004/0091694 A1 | 5/2004 | Holzer et al. |
| 2004/0260009 A1 | 12/2004 | Tosaki et al. |
| 2004/0261839 A1 | 12/2004 | Gee et al. |
| 2005/0176842 A1 | 8/2005 | Graichen et al. |
| 2005/0209360 A1 | 9/2005 | Graichen et al. |
| 2005/0215655 A1 | 9/2005 | Bilodeau |
| 2005/0239916 A1 | 10/2005 | Day et al. |
| 2005/0266237 A1 | 12/2005 | Asthana et al. |
| 2006/0128065 A1 | 6/2006 | Inada et al. |
| 2006/0155085 A1* | 7/2006 | Kohgo ............... C08F 220/12 526/127 |
| 2007/0021521 A1 | 1/2007 | Cheng et al. |
| 2007/0021566 A1 | 1/2007 | Tse et al. |
| 2007/0036930 A1 | 2/2007 | Kontani et al. |
| 2007/0092733 A1 | 4/2007 | Yang et al. |
| 2007/0231571 A1 | 10/2007 | Lane et al. |
| 2007/0261785 A1 | 11/2007 | Izumi et al. |
| 2008/0118764 A1 | 5/2008 | Shintani et al. |
| 2008/0160300 A1 | 7/2008 | Hwang et al. |
| 2008/0171187 A1 | 7/2008 | Inada et al. |
| 2008/0281047 A1 | 11/2008 | Kishioka |
| 2009/0042004 A1 | 2/2009 | Yano et al. |
| 2009/0075008 A1 | 3/2009 | Hwang et al. |
| 2009/0104445 A1 | 4/2009 | Inoue et al. |
| 2009/0104450 A1 | 4/2009 | Inoue et al. |
| 2009/0162577 A1 | 6/2009 | Inoue et al. |
| 2009/0194320 A1 | 8/2009 | Okumara |
| 2009/0208741 A1 | 8/2009 | Toyama et al. |
| 2009/0229732 A1 | 9/2009 | Determan et al. |
| 2009/0233093 A1 | 9/2009 | Toyama et al. |
| 2009/0258224 A1 | 10/2009 | Kawabe et al. |
| 2009/0324945 A1 | 12/2009 | Licht et al. |
| 2010/0028662 A1 | 2/2010 | Shintani et al. |
| 2010/0098962 A1 | 4/2010 | Hanley |
| 2010/0101723 A1 | 4/2010 | Okamoto et al. |
| 2010/0112346 A1 | 5/2010 | Kondou et al. |
| 2010/0120931 A1 | 5/2010 | Zajaczkowski et al. |
| 2010/0200063 A1 | 8/2010 | Djeu |
| 2010/0233467 A1 | 9/2010 | Niwa et al. |
| 2010/0311920 A1 | 12/2010 | Gonzalez et al. |
| 2010/0314813 A1 | 12/2010 | Wojtowicki et al. |
| 2011/0007244 A1 | 1/2011 | Kim et al. |
| 2011/0070434 A1 | 3/2011 | Hirose et al. |
| 2011/0100415 A1 | 5/2011 | Osamura et al. |
| 2011/0118372 A1 | 5/2011 | Lester et al. |
| 2011/0122343 A1* | 5/2011 | Park ............... C08F 220/18 349/96 |
| 2011/0123800 A1 | 5/2011 | Sherman et al. |
| 2011/0159238 A1 | 6/2011 | Kawamori et al. |
| 2011/0177341 A1 | 7/2011 | Clark et al. |
| 2011/0213067 A1 | 9/2011 | Moeller et al. |
| 2011/0250446 A1 | 10/2011 | Higuchi et al. |
| 2011/0300709 A1 | 12/2011 | Shintani |
| 2012/0028380 A1 | 2/2012 | Takamoto et al. |
| 2012/0058334 A1 | 3/2012 | Okamoto et al. |
| 2012/0100326 A1 | 4/2012 | Sherman et al. |
| 2012/0121824 A1 | 5/2012 | Toyama et al. |
| 2012/0126380 A1 | 5/2012 | Uenda et al. |
| 2012/0171915 A1 | 7/2012 | Bartholomew et al. |
| 2012/0177901 A1 | 7/2012 | Hirose et al. |
| 2012/0185222 A1 | 7/2012 | Frepoli et al. |
| 2012/0237764 A1 | 9/2012 | Soejima et al. |
| 2012/0259050 A1 | 10/2012 | Vitrano et al. |
| 2012/0270038 A1 | 10/2012 | Kim et al. |
| 2012/0276376 A1 | 11/2012 | Yonezaki |
| 2012/0325402 A1 | 12/2012 | Suwa et al. |
| 2013/0034737 A1 | 2/2013 | Imoto et al. |
| 2013/0059971 A1 | 3/2013 | Miller et al. |
| 2013/0136874 A1 | 5/2013 | Xia et al. |
| 2013/0158176 A1 | 6/2013 | Hu et al. |
| 2013/0177758 A1 | 7/2013 | Shigetomi et al. |
| 2013/0190457 A1 | 7/2013 | Prenzel et al. |
| 2013/0233485 A1 | 9/2013 | Herr et al. |
| 2013/0273362 A1 | 10/2013 | Traser et al. |
| 2013/0330546 A1 | 12/2013 | Takami et al. |
| 2013/0344276 A1 | 12/2013 | Seitz et al. |

(56) References Cited

U.S. PATENT DOCUMENTS

| | | | |
|---|---|---|---|
| 2014/0008821 A1 | 1/2014 | Toyoda et al. |
| 2014/0037874 A1 | 2/2014 | Subramanian et al. |
| 2014/0065414 A1 | 3/2014 | Tamura et al. |
| 2014/0079947 A1 | 3/2014 | Tamura et al. |
| 2014/0160405 A1 | 6/2014 | Huh et al. |
| 2014/0162082 A1 | 6/2014 | Gleason et al. |
| 2014/0213996 A1 | 7/2014 | Petersen et al. |
| 2014/0255681 A1 | 9/2014 | Epple et al. |
| 2014/0329958 A1 | 11/2014 | Lester et al. |
| 2014/0377554 A1 | 12/2014 | Cho et al. |
| 2015/0073110 A1 | 3/2015 | Malofsky et al. |
| 2015/0087760 A1 | 3/2015 | Kanderski et al. |
| 2015/0137089 A1 | 5/2015 | Kitazawa et al. |
| 2015/0140343 A1 | 5/2015 | Hattori et al. |
| 2015/0159053 A1 | 6/2015 | Schumann et al. |
| 2015/0252227 A1 | 9/2015 | Zajaczkowski et al. |
| 2015/0267090 A1 | 9/2015 | Zajaczkowski et al. |
| 2015/0275057 A1 | 10/2015 | Zajaczkowski et al. |
| 2015/0275058 A1 | 10/2015 | Zajaczkowski et al. |
| 2015/0299536 A1 | 10/2015 | Xiao et al. |
| 2015/0337185 A1 | 11/2015 | Sherman et al. |
| 2016/0053056 A1* | 2/2016 | Gould ............. C09D 183/10 428/447 |
| 2016/0130478 A1 | 5/2016 | Nagata et al. |
| 2016/0232821 A1 | 8/2016 | Janko |
| 2016/0257472 A1 | 9/2016 | Boyce et al. |
| 2016/0257858 A1 | 9/2016 | Zajaczkowski et al. |
| 2017/0128615 A1 | 5/2017 | Bartholomew et al. |
| 2017/0275501 A1 | 9/2017 | Zajaczkowski et al. |
| 2017/0275502 A1 | 9/2017 | Zajaczkowski et al. |
| 2017/0275503 A1 | 9/2017 | Zajaczkowski et al. |
| 2017/0275504 A1 | 9/2017 | Zajaczkowski et al. |
| 2018/0305583 A1 | 10/2018 | Zajaczkowski et al. |
| 2018/0305584 A1 | 10/2018 | Zajaczkowski et al. |
| 2018/0305585 A1 | 10/2018 | Zajaczkowski et al. |
| 2018/0305591 A1 | 10/2018 | Zajaczkowski et al. |

FOREIGN PATENT DOCUMENTS

| | | |
|---|---|---|
| CN | 101230177 | 7/2008 |
| CN | 101297011 | 10/2008 |
| CN | 101641418 | 2/2010 |
| CN | 102876248 | 1/2013 |
| CN | 103108930 | 5/2013 |
| CN | 106164121 | 11/2016 |
| CN | 107075321 | 8/2017 |
| EA | 011898 | 6/2009 |
| EP | 0015004 | 5/1984 |
| EP | 0400703 | 12/1990 |
| EP | 0471767 | 2/1992 |
| EP | 0529546 | 3/1993 |
| EP | 1045886 | 9/2003 |
| EP | 1479746 | 11/2004 |
| EP | 1311559 | 8/2006 |
| EP | 1792925 | 6/2007 |
| EP | 1358066 | 3/2010 |
| EP | 2236534 | 10/2010 |
| EP | 2087021 | 12/2011 |
| EP | 2414418 | 2/2012 |
| EP | 2552497 | 2/2013 |
| EP | 2643418 | 10/2013 |
| EP | 2759578 | 7/2014 |
| EP | 2831125 | 2/2015 |
| JP | 2001-288438 | 10/2001 |
| JP | 2002-285106 | 10/2002 |
| JP | 2003-138234 | 5/2003 |
| JP | 2005-520266 | 7/2005 |
| KR | 2008-0060604 | 7/2008 |
| KR | 2009/0064898 | 6/2009 |
| RU | 2461074 | 9/2012 |
| TW | 201245399 | 11/2012 |
| WO | 97/33921 | 9/1997 |
| WO | 98/03603 | 1/1998 |
| WO | 2000/042648 | 7/2000 |
| WO | 2003/045120 | 5/2003 |
| WO | 2004/015019 | 2/2004 |
| WO | 2004/109786 | 12/2004 |
| WO | 2005/103178 | 11/2005 |
| WO | 2005/105857 | 11/2005 |
| WO | 2006/101699 | 9/2006 |
| WO | 2006/102016 | 9/2006 |
| WO | 2007/047513 | 4/2007 |
| WO | 2008/005501 | 1/2008 |
| WO | 2008/067503 | 6/2008 |
| WO | 2008/091050 | 7/2008 |
| WO | 2008/093398 | 8/2008 |
| WO | 2008/093653 | 8/2008 |
| WO | 2009/029476 | 3/2009 |
| WO | 2009/133175 | 11/2009 |
| WO | 2010/026172 | 3/2010 |
| WO | 2010/074135 | 7/2010 |
| WO | 2010/078611 | 7/2010 |
| WO | 2010/112537 | 10/2010 |
| WO | 2011/011729 | 1/2011 |
| WO | 2011/084438 | 7/2011 |
| WO | 2011/159716 | 12/2011 |
| WO | 2011/159720 | 12/2011 |
| WO | 2011/159722 | 12/2011 |
| WO | 2011/159727 | 12/2011 |
| WO | 2012/031825 | 3/2012 |
| WO | 2012/035958 | 3/2012 |
| WO | 2012/071484 | 5/2012 |
| WO | 2012/088384 | 6/2012 |
| WO | 2012/129489 | 9/2012 |
| WO | 2013/019492 | 2/2013 |
| WO | 2013/055581 | 4/2013 |
| WO | 2013/083670 | 6/2013 |
| WO | 2013/096068 | 6/2013 |
| WO | 2013-115851 | 8/2013 |
| WO | 2013/148041 | 10/2013 |
| WO | 2013/149165 | 10/2013 |
| WO | 2014/018231 | 1/2014 |
| WO | 2014/018312 | 1/2014 |
| WO | 2014/059055 | 4/2014 |
| WO | 2014/059056 | 4/2014 |
| WO | 2014/059057 | 4/2014 |
| WO | 2014/059058 | 4/2014 |
| WO | 2014/116395 | 7/2014 |
| WO | 2014/138166 | 9/2014 |
| WO | 2015/042501 | 3/2015 |
| WO | 2015/053807 | 4/2015 |
| WO | 2016/053933 | 4/2016 |
| WO | 2016/127056 | 5/2016 |
| WO | 2016/150821 | 9/2016 |

OTHER PUBLICATIONS

International Search Report and Written Opinion dated Apr. 11, 2018 issued in corresponding IA No. PCT/US2017/066993 filed Dec. 18, 2017.

"Dual-Stage Transformable Adhesives: Bridging the Gap Between PSAs and Structural Adhesives," The Adherent Technology Insights from Adhesives Research, vol. 2, Issue 3, Dual Stage Adhesives, © 2012, 1 page.

A.M. Travelpiece et al., "Dielectric Integrity of High-Temperature Nanocomposites," 2008 Annual Report Conference on Electrical Insulation Dielectric Phenomena, © 2008 IEEE, pp. 571-574.

Dr. Graeme A. Roan et al., "Radiation Curable Pressure Sensitive Adhesives," Presented at the Pressure Sensitive Tape Council Conference, May 2004.

James R. Erikson et al., "Kraton Liquid™ Polymer/Solid Polymer Hybrid UV Cure Adhesives with Stable Peel Strength," http://www.pstc.org/files/public/Roan.pdf, Presented at the Pressure Sensitive Tape Council Conference, May 2002, pp. 229-243.

Jong-Yeol Shin et al., "Electrical Properties of the Epoxy Nano-Composites According to Additive," Transactions on Electrical and Electronic Materials, vol. 10, No. 3, Jun. 25, 2009, pp. 97-101.

Joseph V. Koleske et al., "2008 Additive Guide (Impact-Resistance Improved-Zeolites)," Paint & Coatings Industry 24.6, Jun. 2008.

Kyle R. Heimbach, "Transposable Adhesives: Acrylic Pressure Sensitive Adhesives with Reactive Components," Presented at the Pressure Sensitive Tape Council Conference, May 2013.

(56) References Cited

OTHER PUBLICATIONS

M. Spath, "First Experiments on Module Assembly Line Using Back-Contact Solar Cells," Presented at the 23rd European Photovoltaic Solar Energy Conference, Valencia, Spain, Sep. 1-5, 2008.
M.S. Sreekanth et al., "Effect of Concentration of Mica on Properties of Polyester Thermoplastic Elastomer Composites," Journal of Minerals & Materials Characterization & Engineering, vol. 8, No. 4, pp. 271-282, 2009.
Robert Wigdorski, "Taking Pressure Sensitive Adhesves to a Different Level of Performance," https://www.pstc.org/files/public/Wigdorski08.pdf, 2008.
A. Gragossian et al., "Lase Ablation of Aluminum from Normal Evaporation to Phase Explosion," Journal of Applied Physics 105, 103304, 2009.
L. Tunna et al., "Micromachining of copper using Nd: YAG laser radiation at 1064, 532, and 355 nm wavelengths," Optics & Laser Technology 33, pp. 135-143, 2001.
"Handbook of Pressure Sensitive Adhesive Technology," Edited by D. Satas, p. 172, 1989.
Alphonsus V. Pocius, "The Chemical and Physical Properties of Elastomer-Based Adhesives," Adhesion & Adhesives Technology: An Introduction, pp. 230-231, 245, 1997.
Yili Wu, "Pressure Sensitive Adhesives Based on Oleic Acid," A Thesis Submitted to Oregon State University, Presented Jan. 10, 2014.
Talking PSA to a Different Level of Performance, Wigdorski et al.
International Preliminary Report on Patentability dated Jun. 25, 2019 issued in corresponding IA No. PCT/US2017/066993 filed Dec. 18, 2017.

\* cited by examiner

CONVERTIBLE PRESSURE SENSITIVE ADHESIVES COMPRISING URETHANE (METH)ACRYLATE OLIGOMERS

CROSS-REFERENCE TO RELATED APPLICATION

The present application claims priority to U.S. Provisional Patent Application No. 62/437,775 filed Dec. 22, 2016, which is incorporated herein by reference in its entirety.

FIELD

The present subject matter relates to convertible pressure sensitive adhesives based upon certain urethane (meth)acrylate oligomers. The pressure sensitive adhesives can be converted to structural adhesives by exposure to heat or radiation.

BACKGROUND

Liquid adhesives are routinely used for product assembly and process applications due to the strength such adhesives provide in the finished assemblies. However, on many occasions there is a desire to use pressure sensitive adhesives (PSAs) for these end uses due to their ease of use. This desire is often lost because the strength of the PSA systems does not match the end use requirements. Therefore, adhesive compositions that can be converted from a pressure sensitive state to a high strength state are of interest.

Although convertible PSAs are known in the art, many such adhesives are limited in their application and/or use. Accordingly, a need remains for a new class of convertible pressure sensitive adhesives.

SUMMARY

The difficulties and drawbacks associated with previous approaches are addressed in the present subject matter as follows.

In one aspect, the present subject matter provides a convertible pressure sensitive adhesive (PSA) composition, that upon conversion forms a structural adhesive. The PSA composition comprises an acrylic PSA resin. The PSA composition also comprises a urethane (meth)acrylate oligomer which is a reaction product of one of: (i) a polyisocyanate and a hydroxy functional (meth)acrylate, (ii) a monoisocyanate (meth)acrylate and a glycol, and (iii) a diisocyanate, a glycol, and a hydroxy functional (meth)acrylate. The resulting urethane (meth)acrylate oligomer has a weight average molecular weight (Mw) of less than 3,000 g/mol. The term, a molecular weight, herein means a weight average molecular weight, unless specified otherwise.

In another aspect, the present subject matter provides a method of preparing a convertible pressure sensitive adhesive (PSA) composition, that upon conversion forms a structural adhesive. The method comprises providing an acrylic PSA resin. The method also comprises providing at least one urethane (meth)acrylate oligomer which is a reaction product of one of: (i) a polyisocyanate and a hydroxy functional (meth)acrylate, (ii) a monoisocyanate (meth)acrylate and a glycol, and (iii) a diisocyanate, a glycol, and a hydroxy functional (meth)acrylate. The resulting urethane (meth)acrylate oligomer has a weight average molecular weight (Mw) of less than 3,000 g/mol. The method additionally comprises blending the acrylic PSA resin with the urethane (meth)acrylate oligomer.

In still another aspect, the present subject matter provides a method of forming a structural adhesive. The method comprises providing a convertible pressure sensitive adhesive (PSA) composition including an acrylic PSA resin, a urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate, and at least one curing agent. The resulting urethane (meth)acrylate oligomer has a weight average molecular weight (Mw) of less than 3,000 g/mol. The method also comprises subjecting the convertible PSA composition to conditions causing adhesive cure to thereby form the structural adhesive.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides a new class of convertible pressure sensitive adhesive (PSA) compositions which comprise one or more acrylic PSA resins in combination with one or more particular urethane (meth)acrylate oligomer(s). In many embodiments, the urethane (meth)acrylate oligomers are reaction products of (i) a polyisocyanate and a hydroxy functional (meth)acrylate, (ii) a monoisocyanate (meth)acrylate and a glycol, and/or (iii) a diisocyanate, a glycol, and a hydroxy functional (meth)acrylate. That is, in certain embodiments the urethane (meth)acrylate oligomer is a reaction product of one or more polyisocyanate(s) and one or more hydroxy functional (meth)acrylate(s). In other certain embodiments the urethane (meth)acrylate oligomer is a reaction product of one or more monoisocyanate (meth)acrylate(s) and one or more glycol(s). In still other certain embodiments, the urethane (meth)acrylate oligomer is a reaction product of one or more diisocyanate(s), one or more glycol(s), and one or more hydroxy functional (meth)acrylate(s).

The pressure sensitive adhesive compositions are converted to structural adhesives by exposure to heat or radiation. That is, upon heating and/or exposure to radiation such as UV radiation or actinic radiation, the pressure sensitive adhesive is converted to a structural adhesive. A "structural adhesive" as that term is used herein, refers to an adhesive that forms an interfacial bond having greater bond strength (adhesive strength) than the cohesive strength of either the substrate or the adhesive itself, or both. In one embodiment, the structural adhesive forms chemical bonds with, for example, polar groups located on a substrate surface. As such, the adhesive bond may be tenacious and can be selected to be resistant to aggressive agents or environments, such as solvents or acids in the case of agents, and temperature extremes in the case of environment. Other structural adhesives may be employed, alone or in combination with the noted structural adhesives, that can strongly, but not permanently bond to a substrate surface. The bond strength can be determined by, for example, the selection of materials. In one embodiment, the structural adhesive cure mechanism cures the adhesive above the Dahlquist criterion and may be no longer tacky. In another embodiment, the structural adhesive may be a permanent and difficult to remove adhesive that is chemically bonded to a substrate surface. Upon removal of the adhesive, the underlying substrate can potentially be destroyed.

The urethane (meth)acrylate oligomers of the present subject matter can be blended with acrylic PSA resins to provide a structural adhesive after B staging (cross linking) and forming an interpenetrating polymer network. In many embodiments, these oligomers are characterized by a central polyol unit that is endcapped with an isocyanate (meth) acrylate intermediate. Properly formulated, these oligomers are compatible with a broad range of acrylic PSA resins and do not phase separate either in the liquid blend, as a coated film or after B staging (cross linking). It is preferred that the components of the convertible PSA compositions described herein be compatible (i.e., form a homogenous solution) so there will not be phase separation over time, which would lead to inferior properties. If the mixtures are not compatible, there will be phase separation over time, which will lead to poor structural properties. When compatible, the mixtures (i.e., the liquid solutions, dried films, or the compositions after crosslinking) are clear via visual inspection. It has been found that in many embodiments, these oligomers also behave as a compatibilizer for epoxy components, which can be added as an additional component to the adhesive to improve adhesion to metallic substrates, increase tack and cross link the acid functional acrylic PSA resin. If the oligomer also contains acid functionality, then the epoxy component can cross link the acrylic PSA with the (meth)acrylate oligomer(s) to thereby form a continuous cross linked network.

A. Convertible PSA Compositions

In many embodiments, the convertible PSA compositions comprise (i) one or more acrylic PSA resins, (ii) one or more urethane (meth)acrylate oligomers as described herein, (iii) optionally one or more curing agents, (iv) optionally one or more epoxy agents, (v) optionally one or more phosphate agents/adhesion promoters, and/or (vi) optionally one or more functional additives. As will be understood, the term "convertible" refers to a characteristic of the PSAs in which prior to cure, the PSA is tacky and viscous, and after cure exhibits a structural bond. In many embodiments, prior to cure, the pressure sensitive adhesive materials are typically characterized by glass transition temperatures (Tg) in the range of about −70° C. to about 30° C. In particular embodiments of the present subject matter, prior to cure, the pressure sensitive adhesive materials exhibit tackiness at room temperature, e.g., between about 15° C. to about 30° C., and bond to a surface upon application of light pressure.

A widely acceptable quantitative description of a PSA is given by the Dahlquist criterion, which indicates that materials having an elastic modulus (G') of less than $3\times10^6$ dynes/cm$^2$ (i.e., $3\times10^5$ Pa) on a 1-s time scale at the test temperature have PSA properties while materials having a G' in excess of this value do not. Empirically, it was found that materials that exhibit pressure sensitivity are those that are sufficiently soft, exhibiting an elastic modulus of less than $3\times10^5$ Pa ($3\times10^6$ dyn/cm$^2$) on a 1-s time scale at the test temperature. This somewhat surprising but well accepted empirical criterion was first established by Dahlquist and is commonly referred as the "Dahlquist criterion". Acrylic PSA resins of the instant application display plateau elastic/storage modulus (G') of less than $3\times10^6$ dynes/cm$^2$ (i.e., $3\times10^5$ Pa) at room temperature indicating that the acrylic PSAs contemplated in the instant application are PSAs.

A description of useful pressure sensitive adhesives and typical properties may be found in Encyclopedia of Polymer Science and Engineering, Vol. 13. Wiley-Interscience Publishers (New York, 1988). Additional description of useful pressure sensitive adhesives and properties may be found in Encyclopedia of Polymer Science and Technology, Vol. 1, Interscience Publishers (New York, 1964).

1. Acrylic PSA Resins

In many embodiments, the acrylic resins useful in the present subject matter are those composed of homopolymers, copolymers or crosslinked copolymers of at least one acrylic or methacrylic component, for example acrylic esters such as methyl acrylate, ethyl acrylate, n-propyl acrylate, isopropyl acrylate, n-butyl acrylate, isobutyl acrylate, tert-butyl acrylate, amyl acrylate, hexyl acrylate, octyl acrylate, 2-ethylhexyl acrylate, undecyl acrylate or lauryl acrylate, and optionally as a comonomer, a carboxyl-containing monomer such as (meth)acrylic acid [the expression "(meth) acrylic" acid denotes acrylic acid and methacrylic acid], itaconic acid, crotonic acid, maleic acid, maleic anhydride or butyl maleate, a hydroxyl-containing monomer such as 2-hydroxyethyl(meth)acrylate, 2-hydroxypropyl(meth)acrylate or allyl alcohol, an amido-containing monomer such as (meth)acrylamide, N-methyl(meth)acrylamide, or N-ethyl-(meth)acrylamide, a methylol group-containing monomer such as N-methylol(meth)acrylamide or dimethylol(meth) acrylamide, an amino-containing monomer such as aminoethyl(meth)acrylate, dimethylaminoethyl(meth)acrylate or vinylpyridine, or a non-functional monomer such as ethylene, propylene, styrene or vinyl acetate; mixtures thereof, and adhesives containing at least one such adhesives as a main component.

The present subject matter also includes the use of acrylic or methacrylic PSA resins which include architecture/ordered polymers formed via a controlled free-radical polymerization process. The polymerization process includes selecting monomers (and corresponding concentrations) that form homogeneous (single phase) acrylic block copolymers as evidenced by the presence of a single Tg peak temperature on a dynamic mechanical thermal analyzer (DMTA) trace of tan δ (the ratio of loss modulus to the storage modulus) versus temperature, indicative of a homogeneous (single phase) polymer prior to crosslinking. In one aspect, the present subject matter provides an acrylic PSA resin that includes at least one acrylic block copolymer including two first reactive segments A of controlled molecular weight and position and one second segment B of controlled molecular weight and position, wherein each one of the two first reactive segments A is positioned on either side of a middle second segment B on the polymer chain to define an ABA structure or each one of two second segments B is positioned on either side of a middle first reactive segment A on the polymer chain to define an BAB structure. In another aspect, the present subject matter provides an acrylic PSA resin that includes at least one acrylic block copolymer including a reactive segment A of controlled molecular weight and position and a second segment B of controlled molecular weight and position to define an AB structure.

The first reactive segment(s) and second segment are defined by (i) the type of monomers (i.e., UV active monomers, reactive monomers, and/or non-reactive monomers) present in the particular segment and (ii) the ratio of the non-reactive monomers in each segment. The acrylic PSA resin of the present subject matter includes an acrylic polymer comprising or consisting of, amongst other features, a triblock acrylic copolymer having a {(A)(B)(C)}-{(B)(C)}-{(C)(B)(A)} structure, or a {(A)(B)(C)}-{(C)}-{(C)(B)(A)} structure, or a {(A)(C)}-{(C)}-{(C)(A)} structure, or a {(B)(C)}-{(C)}-{(C)(B)} structure, or a diblock acrylic copolymer having a {(A)(B)(C)}-{(B)(C)} structure, or a {(A)(C)}-{(C)} structure, or {(B)(C)}-{(C)} structure, where A represents the at least one monomer having a UV functional group, B represents the at least one monomer having a reactive functional group, and C represents the at least one monomer having a non-reactive functional group. And in the triblock copolymers {(A)(B)(C)}, {(A)(C)}, and {(B)(C)} represent the first reactive segment(s) while {(B)(C)} and {(C)} represent the second segment(s). In the diblock copolymers, {(A)(B)(C)}, {(A)(C)}, and {(B)(C)} represent the first reactive segment(s) while {(C)} represents the second segment(s). That is, the first reactive segment(s) may include a UV active monomer, a reactive monomer, and a non-reactive monomer or the first reactive segment(s) may include a UV active monomer and a non-reactive monomer (i.e., is free of a reactive monomer) and/or the first reactive segment(s) may include a reactive monomer and a non-reactive monomer (i.e., is free of a UV active monomer), while the second segment may include a reactive monomer and a non-reactive monomer (i.e., is free of a UV active monomer) or the second segment may include only non-reactive monomers. In the acrylic copolymers that include a UV active monomer, the at least one monomer having a UV active functional group is about 10% or less, or about 5% or less, or about 4% or less, or about 3% or less by weight of the total polymer weight. The at least one monomer having a reactive functional group in the first reactive segment and the at least one monomer having a reactive functional group in the second segment may be the same type of monomer(s) or different type of monomer(s). The at least one monomer having a non-reactive functional group in the first reactive segment and the at least one monomer having a non-reactive functional group in the second segment may be the same type of monomer(s) or different type of monomer(s). The first reactive segment(s) comprises 40% or less, 30% or less, 20% or less, 10% or less, 5% or less, or 3% or less of the total polymer molecular weight. In particular embodiments, the first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. In other embodiments, the first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more monomers of the second segment. The functional groups of the reactive segment and the second segment are capable of undergoing crosslinking reactions. At least one of the reactive segment and the second segment includes an acrylate group. The reactive segment and the second segment are molecularly miscible before cure as expressed by their properties in the bulk state that are indicative of a single phase behavior or a single phase polymer. That is, the acrylic copolymer is a single phase polymer prior to crosslinking to form the acrylic PSA resin. The acrylic copolymer is a homogeneous polymer prior to crosslinking to form the acrylic PSA resin. The acrylic copolymer is a homogeneous polymer at room temperature.

The first reactive segments A includes at least one monomer having a functional group selected from the group consisting of a UV active functional group, a reactive functional group, a non-reactive functional group, and combinations thereof. The second segment B includes at least one monomer having a functional group selected from the group consisting of a reactive functional group, a non-reactive functional group, and combinations thereof. The reactive functionalities in the first reactive segment A and the second segment B may be the same or different from one another. The non-reactive functionalities in the first reactive segment A and the second segment B may be the same or different from one another. The at least one monomer having a reactive functional group includes at least one monomer derived from the formula (I):

where R is H or $CH_3$ and X includes a functional group capable of crosslinking, wherein the functional group includes at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxy, alkoxymethylol, silane (siloxy), oxazole, cyclic ether groups, and combinations thereof. The at least one monomer having a non-reactive functional group is derived from $C_1$ to about $C_{20}$ alkyl, aryl, or cyclic acrylates or $C_1$ to about $C_{20}$ alkyl, aryl, or cyclic methacrylates. The UV active functional group is represented by formula (II) as follows:

in which $R_1$ and $R_2$ is each independently an organic radical selected from the group of methyl, aryl, and alkyl. In many embodiments, $R_1$ and/or $R_2$ is an aromatic or substituted aromatic group. In certain embodiments, $R_1$ and/or $R_2$ is a phenyl or substituted phenyl group. In particular embodiments, the UV active functional group includes acetophenone, an acetophenone derivative, benzophenone, a benzophenone derivative, anthraquinone, an anthraquinone derivative, benzile, a benzile derivative, thioxanthone, a thioxanthone derivative, xanthone, a xanthone derivative, a benzoin ether, a benzoin ether derivative, an alpha-ketol, an alpha-ketol derivative, and combinations thereof.

In particular embodiments, the reactive functional group(s) are entirely incorporated along an end segment or end segments with the non-reactive functional group(s) randomly incorporated within the same end segment(s) that comprise 40% or less of the total polymer molecular weight, such that the remaining 60% or more of the polymer or polymer interior segment(s) is free of reactive functional groups and includes non-reactive functional group(s) or only non-reactive functional group(s) randomly incorporated therein.

In certain embodiments, the UV active functional groups are incorporated along end segment(s) of the polymer. In particular embodiments, the UV active functional group(s) are entirely incorporated along an end segment or end segments with the reactive functional group(s) and/or the non-reactive functional group(s) randomly incorporated within the same end segment(s) that comprise 40% or less of the total polymer molecular weight, such that the remaining 60% or more of the polymer or polymer interior segment(s) is free of UV functional groups and includes reactive functional group(s) and/or non-reactive functional group(s) randomly incorporated therein.

In other embodiments, the acrylic PSA resin includes an ordered polymer comprising at least two different blocks, including one or more blocks A placed at a first region within the polymer and one or more blocks B placed at a second region within the polymer, and at least one reactive functional group apportioned between the blocks A and B wherein an amount of the at least one reactive functional group in both blocks A and B is apportioned between the blocks A and B in an apportionment ratio of from about 1.1:1 to about 10,000:1 or from about from 1.1:1 to about 1,000:1 or from about 1.1:1 to about 100:1, or from 6:1 to about 10,000:1, or from 6:1 to about 1,000:1, and/or or from 6:1 to about 100:1. In particular embodiments of these ordered polymers, the at least one reactive functional group may be in a higher concentration in an end section of the polymer relative to a middle section of the polymer or the at least one reactive functional group may be in a higher concentration in a middle section of the polymer relative to an end section of the polymer. The first region may be an end section of the polymer and the second region a middle section of the polymer or the first region may be a middle section of the polymer and the second region an end section of the polymer. Other particular embodiments of these ordered polymer may include two block As and one block B, wherein the block As are positioned on either side of the middle block B on the polymer chain to define an ABA structure or the block Bs are positioned on either side of the middle block A on the polymer chain to define a BAB structure. Block A of the ordered polymer contemplated herein comprises a monomer selected from the group consisting of acrylate monomers, methacrylate monomers, and combinations thereof; and the block B includes a polymerizable acrylate comonomer, the blocks A and B including at least one reactive functional group selected from the group consisting of acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, silyl groups, carboxyl groups, carbonyl groups, carbonate ester groups, isocyanato groups, amino groups, amide groups, imide groups, mercapto groups, acetoacetyl groups, and combinations thereof. Non-limiting description and examples of architectured polymers are provided in US Patent Publications 2011/0118372, 2013/0059971, and 2014/0329958.

In one aspect of the present subject matter, the acrylic PSA resin includes an acid functional group. The acid functionality improves adhesion to metal substrates and is a possible cross linking site during the B staging process. The amount of the acrylic PSA resin(s) used in the present subject matter is about 30% to about 95%, or about 40% to about 80%, and/or about 50% to about 70% by weight based on total resin solids.

It will be understood that the present subject matter also includes embodiments wherein the acrylic PSA resin includes at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxy, alkoxymethylol, silane (siloxy), oxazole, cyclic ether groups, and combinations thereof.

Representative and non-limiting examples of ranges of weight average molecular weight (Mw) for the acrylic PSA resins of the present subject matter are from about 100,000 g/mol to about 1,000,000 g/mol, or from about 100,000 g/mol to about 750,000 g/mol, and/or from about 100,000 g/mol to about 500,000 g/mol. However, it will be appreciated that the present subject matter acrylic PSA resins may have molecular weights greater than about 1,000,000 and/or less than about 100,000 g/mol.

Representative and non-limiting examples of ranges of glass transition temperatures (Tg) for the acrylic PSA resins of the present subject matter are from about −70° C. to about 30° C., or from about −50° C. to about 0° C., and/or from about −40° C. to about −10° C. measured using a Dynamic Mechanical Analysis (DMA) or a Differential Scanning calorimetry (DSC) scan. However, it will be appreciated that the present subject matter acrylic PSA resins may have Tgs greater than about 30° C. and/or less than about −70° C.

2. Urethane (Meth)Acrylate Oligomers

As noted, the convertible pressure sensitive adhesives of the present subject matter comprise one or more urethane (meth)acrylate oligomers. The one or more urethane (meth)acrylate oligomer may comprise a mono-(meth)acrylate oligomer, and/or a multi-(meth)acrylate oligomer having 2-5 or 2-3 (meth)acrylate functionalities per molecule. In many embodiments, one or more specific urethane (meth)acrylate oligomers are used which are the reaction products of certain agents as follows.

a. Polyisocyanates and Hydroxy Functional (Meth)Arylates

In one embodiment, the urethane (meth)acrylate oligomer(s) used in the adhesives is a reaction product of polyisocyanates and hydroxy functional (meth)acrylates.

A variety of polyisocyanates can be used including aliphatic polyisocyanates and/or aromatic polyisocyanates. Non-limiting examples of aliphatic polyisocyanates include ethylene diisocyanate, 1,6-hexamethylene diisocyanate, isophorone diisocyanate (IPDI), cyclohexane-1,4-diisocyanate, 4,4'-dicyclohexylmethane diisocyanate, cyclopentylene diisocyanate, hydrogenated 2,4-toluene diisocyanate, and 1-isocyanto-1-methyl-3(4)-isocyanatomethyl cyclohexane (IMO). Mixtures of aliphatic polyisocyanates can also be used. Aromatic polyisocyanates can also be used such as for example toluene diisocyanate (TDI), monomeric and/or polymeric MDI, p-tetramethylxylene diisocyanate (p-TMXDI) and its meta isomer (m-TMXDI). Also included are the isocyanurate, uretdione, biuret, allophanate, etc. versions of certain diisocyanates such as HDI, IPDI and TDI.

A wide array of hydroxy functional (meth)acrylates can be used. Typically, such include $C_1$-$C_{20}$ alkyl or aryl (meth)acrylates and/or (meth)acrylates. Nonlimiting examples of suitable hydroxy functional (meth)acrylates include hydroxypropyl acrylate (HPA), hydroxyethyl acrylate (HEA), hydroxybutyl acrylate (HBA), and combinations thereof. The methacrylate versions of these agents may be used, but they may exhibit lower reactivity and thus take longer to crosslink during B stage curing, i.e., conversion to the structural adhesive. It is contemplated that in certain embodiments specialty hydroxy functional (meth)acrylates such as caprolactone acrylate (commercially available under the SARTOMER® 495B designation from Sartomer Company) could also be used. Alternatively, hydroxy functional (meth)acrylates can be made from the reaction product of monofunctional epoxies with acrylic acid, such as ACE™ hydroxyl acrylate monomer from Hexion Specialties.

For certain applications in which high adhesive strength is not required, use of urethane (meth)acrylate oligomers prepared from one or more diisocyanates and one or more hydroxy functional (meth)acrylates may be suitable, as such oligomers tend to exhibit lower strength properties.

b. Monoisocyanate (Meth)Arylates and Glycols

In another embodiment, the urethane (meth)acrylate oligomer(s) used in the adhesives of the present subject matter is a reaction product of monoisocyanate (meth)acrylate(s) and glycol(s).

A variety of monoisocyanate (meth)acrylate(s) can be used. In many versions 2-isocyano-ethyl acrylate has been found useful.

Similarly, a wide array of glycols can be used. The glycols have a formula HO—R—OH in which R is a linear or branched alkylene radical containing from 2 to 20 carbon atoms or a cycloalkylene radical containing from 6 to 20 carbon atoms. In certain embodiments, other glycols can potentially be used such as poly(alkylene oxide) glycols like diethylene glycol, triethylene glycol, dipropylene glycol, tripropylene glycol, ethoxylated/propoxylated polyols (i.e. ethoxylated TMP). It is also contemplated that alkoxylated amines such as n-methyldiethanol amine; n-butyldiethanol amine; triethanol amine; tripropanol amine; etc., can be used.

Examples of useful glycols include but are not limited to ethylene glycol; propylene glycol; 1,3-propane-diol; 2-methyl-1,3-propane-diol; 2,2-dimethyl-1,3-propane-diol; 2-butyl-2-ethyl-1,3-propanediol; 2,2,4-trimethyl-1,3-pentane-diol; 1,6-hexane-diol; cyclohexanedimethanol, tricyclodecane dimethylol; hydrogenated Bisphenol A, alkoxylated BPA; etc., as well as mixtures of these glycols.

In certain embodiments, aliphatic glycols are used. The aliphatic glycols containing from 2 to 8 carbon atoms are particularly preferred.

In certain versions, the glycol is dimethylolpropionic acid (DMPA); 2-butyl-2-ethyl-1,3-propanediol (BEPD); trimethylolpropane; or combinations thereof.

c. Diisocyanates, Glycols, and Hydroxy Functional (Meth)Arylates

In other embodiments, the urethane (meth)acrylate oligomer(s) used in the adhesives of the present subject matter is a reaction product of diisocyanate(s), glycol(s), and hydroxy functional (meth)acrylate(s) as previously described herein.

In many embodiments, a diisocyanate is used which exhibits a significant difference in reactivity between the two isocyanate groups, such as IPDI and/or TDI.

In addition to, or instead of, any of the glycols noted herein, other glycols having a functionality of 2-3 may potentially be used. For example, in certain versions trimethylolpropane (TMP) and/or glycerol may be used due to their relatively low cost, high availability, and compatibility.

The urethane (meth)acrylate oligomer utilized in the adhesives of the present subject matter typically has a weight average molecular weight (Mw) of less than about 3,000 g/mol. In certain versions of the present subject matter, the molecular weight of the oligomer is less than about 2,500 g/mol or less than about 2,250 g/mol or less than about 2,000 g/mol or less than about 1,750 g/mol or less than about 1,500 g/mol or less than about 1,300 g/mol or less than about 1,200 g/mol or less than about 1,100 g/mol or less than about 1,000 g/mol or less than about 900 g/mol or less than about 800 g/mol or less than about 700 g/mol or less than about 500 g/mol, and in particular versions, the molecular weight is in the range of from about 500 to about 3000 g/mol, or from about 500 to about 2500 g/mol, or from about 2000 to about 500 g/mol, or from about 500 to 1500 g/mol, or from about 500 to 1000 g/mol.

Representative and non-limiting examples of ranges of average molecular weight between crosslinks (Mc) for the urethane (meth)acrylate oligomer of the present subject matter are from about 200 g/mol to about 1250 g/mol, or from about 250 g/mol to about 800 g/mol, and/or from about 300 g/mol to about 500 g/mol. However, it will be appreciated that the present subject matter urethane (meth)acrylate oligomers may have average molecular weight between crosslinks (Mc) greater than about 1,250 and/or less than about 500 g/mol.

The adhesives of the present subject matter generally comprise from about 1% to about 60%, or about 10% to about 50%, or about 30% to about 50%, or about 30% to about 60%, and/or about 20% to about 40% of the urethane (meth)acrylate oligomer prior to curing (all percentages noted herein are percentages by weight unless noted otherwise).

In many versions of the present subject matter, the urethane (meth)acrylate oligomer is prepared from one or more diisocyanates, one or more glycols, and one or more hydroxy functional (meth)acrylates.

Representative and non-limiting examples of ranges of glass transition temperatures (Tg) for the urethane (meth)acrylate oligomers of the present subject matter are from about 0° C. to about 200° C., or from about 25° C. to about 150° C., or from about 30° C. to about 150° C., and/or from about 50° C. to about 120° C. measured using a Dynamic Mechanical Analysis (DMA) or a Differential Scanning calorimetry (DSC) scan.

3. Curing Agents

As noted, the present subject matter adhesives optionally comprise effective amounts of (i) one or more thermal cure agents, and/or (ii) one or more radiation cure agents.

a. Thermal Cure Agents

A wide array of thermal cure agents can be used in the present subject matter adhesives. Many commercially available thermal cure agents can be used.

In many embodiments, the thermal cure agent exhibits an activation temperature within a range of from about 60° C. to about 150° C. In particular embodiments, the thermal cure agent exhibits an activation temperature greater than 80° C.

b. Radiation Cure Agents

Similarly, a wide array of radiation cure agents can be used in the present subject matter adhesives. The radiation cure agents can be activated by exposure to UV radiation for example or to actinic radiation.

4. Epoxy Curing Agents

One or more epoxy curing agents selected from the group consisting of a monofunctional epoxy, a multifunctional epoxy, and combinations thereof can be included in the adhesives of the present subject matter. These epoxy curing agents may be aromatic, aliphatic or cycloaliphatic in nature. Aromatic epoxy curing agents are exemplified by, but not limited to, the polyglycidylether of aromatic polyols, such as bisphenol A, bisphenol F and phenol-formaldehyde novolacs. Aliphatic epoxy curing agents are exemplified by, but not limited to, the polyglycidylether of polyols and polyglycidylesters of polycarboxylic acids. Other aliphatic epoxy curing agents are those derived from epoxidized polyunsaturated oils, such as soybean or linseed oil. Cycloaliphatic epoxy curing agents are exemplified by epoxidized unsaturated cyclic compounds such as 3,4-epoxycyclohexylmethyl-3',4'-cyclohexylcarboxylate. In certain embodiments, the epoxy curing agent is liquid bisphenol A, bisphenol F, and/or novolac diepoxide. In one embodiment, the epoxy curing agent is liquid bisphenol A diepoxide such as those commercially available under the designation EPON 828 from Hexion Specialties. These agents are easily/conveniently available, low cost, provide improved tack and are able to form permanent covalent bonds with an acid functional acrylic PSA resin. If the oligomer also contains acid functionality, then the polyepoxide compounds can cross link both the acrylic PSA resin and the oligomer together to maximize strength properties.

It will be understood that the present subject matter also includes embodiments wherein the urethane (meth)acrylate oligomer includes at least one functional group selected from the group consisting of hydroxyl, carboxyl, acidic, epoxy, silane (siloxy), and acetoacetoxy.

Epoxy resins are well known for their ability to provide high strength structural adhesives. However, bisphenol A epoxies are incompatible with most acrylic PSA resins and blends of these two resins phase separate readily and significantly. This limits their use as cross linkers for acid functional acrylic PSA resins in two stage applications. This incompatibility can be overcome by incorporation of the urethane (meth)acrylate oligomers described herein which act as a compatibilizer between these two resins so that high strength PSA to structural adhesives can be achieved. Liquid bisphenol A, bisphenol F, and/or novolac epoxies provide the added benefit of improving A stage tack in these ternary blends, since the urethane (meth)acrylate oligomers are typically high Tg compounds and may cause significant loss of tack. Cationic catalysts may also be incorporated as latent curing agents for the epoxy/carboxylic cross linking reaction.

The epoxy agent can be incorporated in the adhesives of the present subject matter at nearly any effective amount(s). A typical weight proportion range is from about 0.1% to about 60%, or about 5% to about 40%, about 10% to about 40%, and/or about 10% to about 30% by weight.

5. Phosphate Agents/Adhesion Promoters

As described herein, urethane (meth)acrylate oligomers can be blended with acrylic PSA resins to provide a structural adhesive after B staging (crosslinking) and forming an interpenetrating polymer network. These adhesives can be further improved through the incorporation of monofunctional and/or multifunctional epoxy resins to improve adhesion to metallic substrates, increase tack and crosslink the acid functional acrylic PSA resin. If the oligomer also contains acid functionality, then the epoxy component can crosslink the acrylic PSA with the urethane (meth)acrylate oligomer forming a continuous cross linked network. However, as the cohesive strength of these B stageable adhesives increases, the failure mode shifts to adhesive failure, which limits the ultimate bond strength of a fabricated joint. It has been found that incorporating an epoxy phosphate ester or using a blend of epoxy and phosphoric acid can greatly improve adhesion to metal substrates.

A wide array of epoxy phosphate esters and/or a blend of epoxies and phosphoric acid can be utilized. Other phosphate and non-phosphate based adhesion promoters that may be used in the invention include (meth)acrylated siloxane and (poly)(meth)acrylated phosphates such as trisacryloyloxyethyl phosphate, available from Osaka Organic Chemical under the tradename Viscoat #3PA. Therefore, the adhesion promoters that may be incorporated in the adhesives of the present subject matter include at least one of (i) an epoxy phosphate ester, (ii) a blend of an epoxy agent and phosphoric acid, (iii) (poly)acrylated phosphates, and (iv) (meth) acrylated siloxane.

The phosphate agent(s)/adhesion promoters can be used in the adhesives of the present subject matter at nearly any effective amount(s). A typical weight proportion for all the phosphate agent(s)/adhesion promoters is within a range of from about 0.01% to about 10%, or about 0.1% to about 5%, and/or about 0.5% to about 3% by weight.

6. Functional Additives

A wide array of functional additives can be included in the adhesives of the present subject matter. For example, one or more cross linkers (aluminum acetylacetonate), fillers, tackifiers, plasticizers, catalysts, waxes, antioxidants, processing agents, viscosity adjusters, and combinations thereof can be included in the present subject matter adhesives. Additives may also be used to further improve the curing speed or reduce the amount of catalyst(s) for a given cure rate. Other agents such as cure enhancers and/or sensitizers can be used. Additional agents such as surfactants, wetting agents, dispersing agents, defoamers, stabilizers, UV absorbents, thickeners, and combinations of these with still other agents or additives can be used in the present subject matter adhesives.

In particular embodiments of the present subject matter, the convertible PSAs consist essentially of (i) one or more acrylic PSA resins, and (ii) one or more urethane (meth) acrylate oligomers as described herein. In other embodiments, the convertible PSAs consist essentially of (i) one or more acrylic PSA resins, (ii) one or more urethane (meth) acrylate oligomers, and (iii) one or more curing agents as described herein. In still other embodiments, the convertible PSAs consist essentially of (i) one or more acrylic PSA resins, (ii) one or more urethane (meth)acrylate oligomers, (iii) one or more curing agents, and (iv) one or more of epoxy agent(s) as described herein. In yet another embodiment, the convertible PSAs consist essentially of (i) one or more acrylic PSA resins, (ii) one or more urethane (meth) acrylate oligomers, (iii) one or more curing agents, (iv) one or more of epoxy agent(s), and (v) one or more phosphate agent(s)/adhesion promoters as described herein. In still another embodiment, the convertible PSAs consist essentially of (i) one or more acrylic PSA resins, (ii) one or more urethane (meth)acrylate oligomers, (iii) one or more curing agents, (iv) one or more of epoxy agent(s), (v) one or more phosphate agent(s)/adhesion promoters, and (vi) functional additive(s) as described herein. Typical weight percent concentrations for each of these components are set forth below in Table 1.

| Components | A embodiments | B embodiments | C embodiments |
| --- | --- | --- | --- |
| Acrylic PSA resin | 30%-95% | 40%-80% | 50%-70% |
| Urethane (meth)acrylate oligomer | 1%-60% | 10%-50% | 20%-40% |
| Curing agents (optional) | 0.1%-10% | 0.5%-5% | 1%-4% |

| Components | A embodiments | B embodiments | C embodiments |
|---|---|---|---|
| Epoxy agents (optional) | 0.1%-60% | 5%-40% | 10%-30% |
| Adhesion promoters (optional) | 0.01%-10% | 0.1%-5% | 0.5%-3% |

B. Methods

Typically, the adhesives of the present subject matter are prepared by blending the (i) one or more acrylic PSA resins, (ii) one or more urethane (meth)acrylate oligomers as described herein, (iii) optionally one or more curing agents, (iv) optionally one or more epoxy curing agents, (v) optionally one or more phosphate agents/adhesion promoters, and/or (vi) optionally one or more functional additives. Upon blending and optional further processing, the A-stage version of the adhesive is formed. Upon curing, i.e., cross-linking by thermal or radiation means, the B-stage version of the adhesive is formed.

In one embodiment, the present subject matter provides a method of preparing a convertible pressure sensitive adhesive (PSA), that upon conversion forms a structural adhesive. The method comprises providing an acrylic PSA resin, and providing at least one urethane (meth)acrylate oligomer which is a reaction product of one of: (i) a polyisocyanate and a hydroxy functional (meth)acrylate, (ii) a monoisocyanate (meth)acrylate and a glycol, and (iii) a diisocyanate, a glycol, and a hydroxy functional (meth)acrylate. The method also comprises blending the acrylic PSA resin with the urethane (meth)acrylate oligomer.

In another embodiment, the present subject matter also provides a method of forming a structural adhesive. The method comprises providing a convertible pressure sensitive adhesive (PSA) including an acrylic PSA resin, a urethane (meth)acrylate oligomer which is a reaction product of one of: (i) a polyisocyanate and a hydroxy functional (meth) acrylate, (ii) a monoisocyanate (meth)acrylate and a glycol, and (iii) a diisocyanate, a glycol, and a hydroxy functional (meth)acrylate, and at least one curing agent. The method also comprises subjecting the convertible PSA to conditions causing adhesive cure to thereby form the structural adhesive.

As previously noted, in certain embodiments, (meth) acrylate versions of the PSA resins can be used. The (meth)acrylate functional acrylic PSA resins may be used "as is" for a B stageable PSA to structural adhesive. Alternatively, the (meth)acrylate PSA resin may be blended with urethane (meth)acrylate oligomers and/or epoxy resins for improved strength and/or adhesion. These (meth)acrylic resins typically are made in a two stage process. In the first stage an acid functional solution acrylic is made using standard conditions under an inert atmosphere. In the second stage, air is then sparged into the acrylic resin and glycidyl methacrylate (GMA), a free radical inhibitor and an epoxy/carboxylic acid catalyst is added. The reaction is allowed to proceed until all the GMA is reacted. The amount and type of (meth)acrylate monomers that are used for the first stage are dependent on the final desired properties; notably Tg and acid concentration. The acid concentration should be higher than the GMA concentration so there are residual acid groups left to react with aluminum acetylacetonate and obtain the necessary A-stage properties. The concentration of GMA to be added will be dependent on the desired final cross link density of the adhesive blend. Free radical inhibitors (hydroquinone, benzoquinone, hydroquinone monomethyl ether and the like), must be added to the second stage to prevent premature gelation of the resin. Air sparging is also required to keep the free radical inhibitors active. The epoxy/carboxylic acid catalyst is preferably an imidazole compound. Benzylimidazole is preferred due to its ease of handling (liquid form), solubility and reactivity at relatively low temperature 70°-80° C.

C. Applications

The present subject matter can be used for bonding or otherwise adhering film to film, film to foil, aprons to foil, aprons to film, fabric to fabric, fabric to nearly any other material or substrate such as films, papers, and metals, paper to metal, metal to metal, films to other plastics, plastics to plastics, and combinations of these with other surfaces, materials, and/or substrates. The present subject matter can also be used to provide chemical resistance, e.g., corrosion resistance, to a variety of surfaces and substrates. For example, the subject matter can be used to provide chemically resistant labels, and solvent resistant laminates such as solvent resistant glass and foil assemblies. The present subject matter can also be utilized to form film laminates such as film to film laminates. Another contemplated application of the present subject matter is in the field of shrink sleeves and shrink sleeve labels. Furthermore, the present subject matter may find wide applications for solvent welding of two films. Yet another field of application relates to corrosion protection of components and particularly metal pipes such as oil and gas pipelines. The present subject matter compositions and methods can be used to provide or increase impact resistance, structural integrity, and protection against corrosion or exposure to environmental agents. A particular and nonlimiting example of such corrosion protection is providing an outer layer, an inner layer, or both along outer and/or inner circumferential surfaces of pipes. Another significant benefit of certain compositions in accordance with the present subject matter is that the compositions can be subjected to bending, flexing, or other stresses without cracking. This is desirable if for example the composition(s) is applied to piping. Yet another contemplated application for certain compositions of the present subject matter is in forming fiberglass structures such as marine boat hulls, certain sporting goods, and structural members. Still another application for the present subject matter is in "roll on, shrink on" (ROSO) applications.

In many embodiments, the present subject matter adhesives after conversion to a structural adhesive exhibit relatively high lap shear strengths. Lap shear strength is measured as described herein in association with the accompanying examples. In many embodiments, the adhesives exhibit a lap shear strength of at least 350 psi, at least 400 psi, at least 500 psi, at least 750 psi, at least 1,000 psi, at least 1,250 psi, at least 1,500 psi, at least 1,750 psi, at least 2,000 psi, at least 2,250 psi or greater.

EXAMPLES

Various testing and measurements were performed upon assemblies and/or adhesives of the present subject matter to assess and evaluate such. The following describes or references the procedures by which such aspects or measurements were obtained.

Lap Shear—Lap shear was determined in accordance with ASTM D1002.

Viscosity—Viscosity of solution PSAs and urethane (meth)acrylate oligomers was measured using a Brookfield RV viscometer.

Loop Tack—Loop tack was determined according to ASTM D6195.

T-Peel—T-peel (max and average) was determined according to ASTM D1876.

The weight average molecular weight (Mw) and polydispersity (PDI) were determined by gel permeation chromatography (GPC) using polystyrene standards.

The average molecular weight between crosslinks (Mc) was calculated according to the theory of Flory and Rehner {Shen et al., *J. Polym. Sci., Polym. Phys.*, 34:1063-1077 (1996)}.

As used herein, room temperature is from about 15° to about 30° C.

The following examples show the usefulness of the present subject matter. Blends were made of the respective acrylic PSA resins and urethane (meth)acrylate oligomers as listed below. To each blend was also added: 1% benzoyl peroxide; 0.5% of an aluminum acetylacetonate (AAA) solution and 0.05% of 4-hydroxy TEMPO (all additions based on total resin solids). Adhesive films were made at 4 mils dry thickness. Lap shear samples were clamped together for 72 hours to wet out the substrate prior to curing. The cure conditions used for B staging the adhesives was 4 hours at 130° C.

Example 1

A solution acrylic PSA resin was made from butyl acrylate (83%), N,N-dimethyl acrylamide (10%) and acrylic acid (7%). The resin had a viscosity of 7,880 cps at 46.7% non-volatiles. Mn=34,900, Mw=243,380 PD=6.97, Tg=−39° C.

Example 2

A solution acrylic PSA resin was made from butyl acrylate (90%) and acrylic acid (10%). The resin had a viscosity of 4,980 cps at 44.6% non-volatiles. Mn=54,970, Mw=358,700, PD=6.5, Tg=−44° C.

Example 3 Comparative

A urethane acrylate oligomer was made from a polyester polyol (3/2 ratio of neopentyl glycol/phthalic anhydride) capped with a toluene diisocyante/hydroxyethyl acrylate adduct. The resin had a viscosity of 825 cps at 61.2% non-volatiles. It formed a clear (i.e., homogeneous) solution when blended with the resin of Example 1 at a 40/60 ratio of acrylic resin/oligomer, but the dried adhesive film was cloudy. Lap shear strength was 878 psi and the samples failed cohesively. This comparative example shows the poor compatibility when using TDI. The (relatively) high molecular weight between cross links (from using a polyester polyol instead of a glycol) gives lower strength properties, as can be seen in the following examples.

Example 4

A urethane acrylate oligomer was made from trimethylolpropane capped with an isophorone diisocyanate/hydroxypropyl acrylate adduct. The resin had a viscosity of 4,500 cps at 71.6% non-volatiles. It formed a clear solution when blended with the resin of Example 1 at a 60/40 ratio of acrylic resin/oligomer and the dried adhesive film was clear. Lap shear strength was 1,260 psi with a mix of adhesive and cohesive failure.

Example 5

A urethane acrylate oligomer was made from dimethylolpropionic acid capped with an isophorone diisocyanate/hydroxypropyl acrylate adduct. The resin had a viscosity of 1,020 cps at 63.1% non-volatiles. It formed a clear solution when blended with the resin of Example 1 at a 60/40 ratio of acrylic resin/oligomer and the dried adhesive film was clear. Lap shear strength was 1,475 psi and the samples failed cohesively. This example shows the benefit of having an acid functional oligomer with improved adhesion to metal substrates.

Examples 6, 7, 8

Three adhesive blends were made using 60% of Example 2 acrylic resin and varying ratios of the 2 previously listed oligomers (Examples 4 and 5): (30/10), (20/20) and (10/30). Example 6: lap shear strength maxed out the MTS instrument at 2,248 psi. Example 7: lap shear strength=2,208 psi. Example 8: lap shear strength=2,033 psi. All three adhesive blends exhibited a mix of adhesive and cohesive failure modes. These examples show that the lap shear strength is maximized when the oligomer functionality is greater than 2, but less than 3.

Example 9 Comparative

An adhesive blend was made using 60% Example 1 acrylic resin and 40% Genomer 4302. Genomer 4302 is a commercially available urethane acrylate from Rahn and is the trimer (isocyanurate) of hexamethylene diisocyanate reacted with hydroxyethyl acrylate. The lap shear strength of this adhesive blend was only 466 psi and failed cohesively. This comparative example shows the importance of balancing the functionality of the oligomer and its molecular weight between cross links.

Example 10

An adhesive blend containing 60% of the resin of Example 2, 35% of the resin of Example 5 and 5% of Epon 828 was made to show the effect of cross linking the acrylic PSA resin with the oligomer. Lap shear strength was 2,245 psi and the failure mode was adhesive. This represents a 52% increase in lap shear strength compared to Example 5 which had a 60/40 ratio of acrylic resin/oligomer.

Example 11

A solution acrylic PSA resin was made from butyl acrylate (85.6%) and acrylic acid (14.4%). The resin had a viscosity of 5,270 cps at 45.4% non-volatiles. Tg=−40° C.

Example 12

A urethane acrylate oligomer was made from 2,2,4-trimethyl-1,3-pentanediol (TMPD) capped with an isophorone diisocyanate/hydroxypropyl acrylate adduct. The resin had a viscosity of 2,500 cps at 78.7% non-volatiles.

Example 13

A urethane acrylate oligomer was made from 1,3-propanediol (PDO) capped with an isophorone diisocyanate/ hydroxypropyl acrylate adduct. The resin had a viscosity of 1,140 cps at 68.1% non-volatiles.

Example 14

A urethane acrylate oligomer was made from 2-butyl-2-ethyl-1,3-propanediol (BEPD) capped with an isophorone diisocyanate/hydroxypropyl acrylate adduct. The resin had a viscosity of 1,710 cps at 73.8% non-volatiles.

Examples 15, 16, 17, 18

Four adhesive blends were made using 60% of Example 11 acrylic resin and 40% of the following oligomers from Example 5, Example 12, Example 13, and Example 14. Example 15: lap shear strength=1,882 psi. Example 16: lap shear strength=1,513 psi. Example 17: lap shear strength=2,200 psi. Example 18: lap shear strength=1,705 psi. Example 15 had a mix of adhesive and cohesive failure, but the other three adhesive blends failed adhesively. Loop tack results (A-stage) were 0.27, 3.66, 4.88 and 4.14 PLI respectively. T-Peel (average) strengths were 3.20, 2.18, 1.00, and 7.84 PLI respectively. T-Peel (max) strengths were 5.32, 12.60, 8.14, and 14.22 PLI respectively. Table 1 summarizes these properties.

TABLE 1

Summary of Properties of Adhesives of Examples 15, 16, 17, and 18

| Example No. | Lap Shear Strength (PSI) | Loop Tack (A-Stage) (PLI) | T-Peel (Average) (PLI) | T-Peel (Maximum) (TPLI) |
|---|---|---|---|---|
| 15 | 1,882 | 0.27 | 3.20 | 5.32 |
| 16 | 1,513 | 3.66 | 2.18 | 12.60 |
| 17 | 2,200 | 4.88 | 1.00 | 8.14 |
| 18 | 1,705 | 4.14 | 7.84 | 14.22 |

These examples show how tack, peel strength and lap shear strength can be controlled based on the glycol structure.

The following examples further show the usefulness of the present subject matter. Blends were made of the respective acrylic PSA resins, urethane (meth)acrylate oligomers, and epoxy resin as listed below. To each blend was also added: 1% benzoyl peroxide; 0.5% of an aluminum acetylacetonate solution and 0.05% of 4-hydroxy TEMPO (all additions based on total resin solids). Adhesive films were made at 4 mils dry thickness. Lap shear samples were clamped together for 72 hours to wet out the substrate prior to curing. The cure conditions used for B staging the adhesives was 4 hours at 130° C. unless otherwise noted.

Example 19

A solution acrylic PSA resin was made from butyl acrylate (83%), N,N-dimethyl acrylamide (10%) and acrylic acid (7%). The resin had a viscosity of 7,880 cps at 46.7% non-volatiles. Mn=34,900, Mw=243,380 PD=6.97, Tg=−39° C.

Example 20

A solution acrylic PSA resin was made from butyl acrylate (90%) and acrylic acid (10%). The resin had a viscosity of 4,980 cps at 44.6% non-volatiles. Mn=54,970, Mw=358,700, PD=6.5, Tg=−44° C.

Example 21

A urethane acrylate oligomer was made from dimethylolpropionic acid capped with an isophorone diisocyanate/hydroxypropyl acrylate adduct. The resin had a viscosity of 1,020 cps at 63.1% non-volatiles. It formed a clear solution when blended with the resin of Example 19 at a 60/40 ratio of acrylic resin/oligomer and the dried adhesive film was clear. Lap shear strength was 1,475 psi and the samples failed cohesively.

Examples 22, 23, 24, 25

Adhesive blends were made containing 60% of Example 20 acrylic PSA resin and 4 ratios of Example 21 oligomer with Epon 828: (35/5), (30/10), (25/15) and (20/20). Loop tack values for these blends were 4.7 lbs, 6.5 lbs, 9.6 lbs and 7.7 lbs respectively and show the advantage of incorporating epoxy agents such as liquid bisphenol A into the acrylic PSA/oligomer blends. Lap shear strengths for these 4 blends were 2245 psi, 1821 psi, 1517 psi and 1290 psi respectively. In all 4 evaluations the failure mode was adhesive. Notice that incorporation of just 5% of Epon 828 increased lap shear strength by 52% compared to Example 21 which had a 60/40 ratio of acrylic resin/oligomer. Also of note in this evaluation was the decreasing lap shear strength with higher levels of Epon 828, which was likely attributable to unreacted epoxy, which plasticized the adhesive.

Examples 26, 27, 28, 29

Examples 22, 23, 24, and 25 were repeated except that the lap shear specimens were cured for 4 hours at 160° C. to drive the epoxy/carboxylic acid cross linking reaction. Lap shear strengths were 1252 psi, 976 psi, 844 psi and 1022 psi respectively. In all 4 evaluations the failure mode was adhesive. Unexpectedly the lap shear strengths in all 4 samples was significantly lower than in the previous evaluation. This may have been due to thermal degradation of the urethane acrylate oligomers as well as some amount of unreacted epoxy.

Examples 30, 31, 32, 33

Examples 22, 23, 24, and 25 were repeated except that 3% of Syna-PI 6976 (a cationic catalyst) was added to all 4 blends. The lap shear specimens were cured for 4 hours at 130° C. to minimize degradation of the oligomer. Lap shear strengths were 2242 psi, 2214 psi, 2248 psi and 2224 psi respectively. Note that 5 of the 8 lap shear specimens did not break, but maxed out the MTS tester at 2248 psi and this value was used to calculate the average strength. In the specimens that did fail, the failure mode was a mix of adhesive/cohesive.

The following examples further show the usefulness of the present subject matter. Blends were made of an acrylic PSA resin, urethane acrylate oligomer and epoxy resin as listed below. To each blend was also added: 1% benzoyl peroxide; 0.5% of an aluminum acetylacetonate solution and 0.05% of 4-hydroxy TEMPO (all additions based on total resin solids). Adhesive films were made at 4 mils dry thickness. Lap shear samples were clamped together for 72 hours to wet out the substrate prior to curing. The cure conditions used for B staging the adhesives was 4 hours at 130° C. unless otherwise noted.

Example 34

A solution acrylic PSA resin was made from butyl acrylate (85.6%) and acrylic acid (14.4%). The resin had a viscosity of 5,270 cps at 45.4% non-volatiles. Tg=−40° C.

Example 35

A urethane acrylate oligomer was made from dimethylolpropionic acid capped with an isophorone diisocyanate/hydroxypropyl acrylate adduct. The resin had a viscosity of 10,940 cps at 71.8% non-volatiles.

Examples 36, 37, 38, 39, 40

Five adhesive blends were made using 60% of Example 34 acrylic resin, 25% of Example 35 urethane acrylate oligomer and 15% of Epon 828. To these blends were added phosphoric acid (50% solution in water) at increasing levels; 0%, 0.17%, 0.33%, 0.49% and 0.65% by weight on total resin solids to essentially make an epoxy phosphate ester in situ as an adhesion promoter. These amounts equate to the percentage of epoxy groups that can react with the phosphoric acid groups and correspond to 12.5%, 25%, 37.5% and 50% of epoxy groups consumed. The lap shear strengths for these samples were: 1614 psi, 1731 psi, 2019 psi, 1750 psi and 2183 psi. Most notable from this evaluation was the change in failure mode. Example 36, with no phosphoric acid, had 100% adhesive failure. By contrast, the other 4 examples all failed cohesively. These examples show that the lap shear strength increases significantly with increasing phosphoric acid content (i.e., the ultimate joint strength was limited by the adhesive strength, not cohesive strength of the PSA to structural adhesive).

The following examples further show the usefulness of the present subject matter. Blends were made of the respective methacrylate functional acrylic PSA resins and urethane acrylate oligomer as listed below. To each blend was also added: 1% benzoyl peroxide; 0.5% of an aluminum acetylacetonate solution and 0.05% of 4-hydroxy TEMPO (all additions based on total resin solids). Adhesive films were made at 4 mils dry thickness. Lap shear samples were clamped together for 72 hours to wet out the substrate prior to curing. The cure conditions used for B staging the adhesives was 4 hours at 130° C.

Example 41

A solution acrylic PSA resin was made from butyl acrylate (84%) and acrylic acid (16%). The resin had a viscosity of 5,000 cps at 43.3% non-volatiles. Tg=−40° C.

Example 42

A methacrylate functional acrylic PSA resin was made from the resin of Example 41 reacted with enough GMA to give one methacrylate group per 2,000 molecular weight. Hydroquinone was used as the free radical inhibitor at about 900 ppm based on total resin solids and Curezol 1B2MZ (benzylimidazole) was used as the epoxy catalyst at 0.5 pph based on total resin solids. The resin had a viscosity of 404 cps at 28.8% non-volatiles.

Example 43

A urethane acrylate oligomer was made from dimethylolpropionic acid capped with an isophorone diisocyanate/ hydroxypropyl acrylate adduct. The resin had a viscosity of 10,940 cps at 71.8% non-volatiles. It formed a clear solution when blended with the resin of Example 42 at a 60/40 ratio of acrylic resin/oligomer and the dried adhesive film was clear.

Examples 44, 45, 46, 47, 48

Blends were made from the methacrylate functional acrylic PSA resin of Example 42 and the urethane acrylate oligomer of Example 43 at the following ratios: (100/0), (90/10), (80/20), (70/30) and (60/40). The lap shear strengths were 558 psi, 436 psi, 555 psi, 1106 psi and 1667 psi respectively. Examples 44-47 had a mix of adhesive/cohesive failure. Example 48 failed adhesively. These examples show that the methacrylate functional acrylic PSA resin can be used by itself as a B stageable PSA or that it can be blended with urethane acrylate oligomers for higher strength properties.

Example 49

A solution acrylic PSA resin was made from butyl acrylate (86%) and acrylic acid (14%). The resin had a viscosity of 5,270 cps at 45.4% non-volatiles. Tg=−40° C.

Example 50

A methylacrylate functional acrylic PSA resin was made from the resin of Example 49 reacted with enough GMA to give one methacrylate group per 1,000 molecular weight. Hydroquinone was used as the free radical inhibitor at about 100 ppm based on total resin solids and Curezol 1B2MZ (benzylimidazole) was used as the epoxy catalyst at 0.5 pph based on total resin solids. The resin had a viscosity of 1,380 cps at 36.6% non-volatiles.

Examples 51, 52, 53, 54, 55

Blends were made from the methacrylate functional acrylic PSA resin of Example 50 and the urethane acrylate oligomer of Example 43 at the following ratios: (100/0), (90/10), (80/20), (70/30) and (60/40). The lap shear strengths were 493 psi, 805 psi, 1459 psi, 2029 psi and 2248+ psi respectively. Examples 51-54 failed adhesively. Example 55 maxed out the MTS instrument without breaking. These examples show that the methacrylate functional acrylic PSA resin can be used by itself as a B stageable PSA or that it can be blended with urethane acrylate oligomers for higher strength properties.

Example 56

A methacrylate functional acrylic PSA resin was made from the resin of Example 49 reacted with enough GMA to give one methacrylate group per 500 molecular weight. Hydroquinone was used as the free radical inhibitor at about 100 ppm based on total resin solids and Curezol 1B2MZ (benzylimidazole) was used as the epoxy catalyst at 0.5 pph based on total resin solids. The resin had a viscosity of 800 cps at 33.0% non-volatiles.

Examples 57, 58, 59, 60, 61

Blends were made from the methacrylate functional acrylic PSA resin of Example 56 and the urethane acrylate oligomer of Example 43 at the following ratios: (100/0), (90/10), (80/20), (70/30) and (60/40). The lap shear strengths were 379 psi, 846 psi, 1274 psi, 1814 psi and 1665 psi respectively. Examples 57-61 all failed adhesively. These examples show that the methacrylate functional acrylic PSA resin can be used by itself as a B stageable PSA or that it can be blended with urethane (meth)acrylate oligomers for higher strength properties. Also shown from this last set of examples is that there is an optimum level of methacrylate functionality for obtaining maximum strength properties. A GMA level of 1/1000 molecular weight gave higher lap shear strength than either 1/2000 or 1/500 molecular weight.

Many other benefits will no doubt become apparent from future application and development of this technology.

Further examples consistent with the present teachings are set out in the following number clauses.

Clause 1. A convertible pressure sensitive adhesive (PSA) composition, that upon conversion forms a structural adhesive, the PSA composition comprising: an acrylic PSA resin; a urethane (meth)acrylate oligomer which is a reaction product of one of: (i) a polyisocyanate and a hydroxy functional (meth)acrylate, (ii) a monoisocyanate (meth) acrylate and a glycol, (iii) a diisocyanate, a glycol, and a hydroxy functional (meth)acrylate, wherein the urethane (meth)acrylate oligomer has a weight average molecular weight (Mw) of less than 3,000 g/mol.

Clause 2. The PSA composition of clause 1 wherein the acrylic PSA resin has a weight average molecular weight (Mw) in the range of from about 100,000 g/mol to about 1,000,000 g/mol.

Clause 3. The PSA composition of clause 1 or 2 wherein prior to conversion to the structural adhesive, the acrylic PSA resin has a glass transition temperature (Tg) in the range of from about −70° C. to about 30° C.

Clause 4. The PSA composition of any one of clauses 1 to 3 wherein the acrylic PSA resin includes an acid functional group.

Clause 5. The PSA composition of any one of clauses 1 to 4 wherein the acrylic PSA resin is present in the PSA, prior to curing, at a weight proportion in a range of from 30% to 95%.

Clause 6. The PSA composition of any one of clauses 1 to 5 wherein the acrylic PSA resin is formed using a controlled radical polymerization process.

Clause 7. The PSA composition of any one of clauses 1 to 6 wherein the acrylic PSA resin includes at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxy, alkoxymethylol, silane (siloxy), oxazole, cyclic ether groups.

Clause 8. The PSA composition of any one of clauses 1 to 7 wherein the urethane (meth)acrylate oligomer has a weight average molecular weight (Mw) of less than 2,000 g/mol.

Clause 9. The PSA composition of any one of clauses 1 to 8 wherein the urethane (meth)acrylate oligomer has an average molecular weight between crosslinks (Mc) in the range of from about 200 g/mol to about 1250 g/mol.

Clause 10. The PSA composition of any one of clauses 1 to 9 wherein the urethane (meth)acrylate oligomer has a glass transition temperature (Tg) in the range of from about 0° C. to about 200° C.

Clause 11. The PSA composition of any one of clauses 1 to 10 wherein the urethane (meth)acrylate oligomer is a solid at room temperature.

Clause 12. The PSA composition of any one of clauses 1 to 11 wherein the urethane (meth)acrylate oligomer includes an acid functional group.

Clause 13. The PSA composition of any one of clauses 1 to 12 wherein the urethane (meth)acrylate oligomer is selected from the group consisting of a monofunctional urethane (meth)acrylate oligomer, a multifunctional urethane (meth)acrylate oligomer, and combinations thereof.

Clause 14. The PSA composition of any one of clauses 1 to 13 wherein the functionality of the urethane (meth) acrylate oligomer is from 2 to 5.

Clause 15. The PSA composition of any one of claims 1 to 14 wherein the urethane (meth)acrylate oligomer includes at least one functional group selected from the group consisting of hydroxyl, carboxyl, acidic, epoxy, silane (siloxy), and acetoacetoxy.

Clause 16. The PSA composition of any one of clauses 1 to 15 wherein prior to conversion to the structural adhesive, the PSA composition is a homogeneous solution.

Clause 17. The PSA composition of any one of clauses 1 to 16 wherein the urethane (meth)acrylate oligomer is a reaction product of (i).

Clause 18. The PSA composition of any one of clauses 1 to 17 wherein the diisocyanate is selected from the group consisting of isophorone diisocyanate (IPDI), toluene diisocyanate (TDI), and combinations thereof.

Clause 19. The PSA composition of any one of clauses 1 to 18 wherein the hydroxy functional (meth)acrylate includes at least one of (i) $C_1$-$C_{20}$ alkyl (meth)acrylate, (ii) $C_1$-$C_{20}$ aryl (meth)acrylate, and (iii) $C_1$-$C_{20}$ (meth)acrylate.

Clause 20. The PSA composition of any one of clauses 1 to 19 wherein the hydroxy functional (meth)acrylate is selected from the group consisting of hydroxypropyl acrylate (HPA), hydroxyethyl acrylate (HEA), hydroxybutyl acrylate (HBA), and combinations thereof.

Clause 21. The PSA composition of any one of claims 1 to 20 wherein the hydroxy functional (meth)acrylate is selected from the group consisting of hydroxypropyl methacrylate, hydroxyethyl methacrylate, hydroxybutyl methacrylate, and combinations thereof.

Clause 22. The PSA composition of any one of clauses 1 to 16 wherein the urethane (meth)acrylate oligomer is a reaction product of (ii).

Clause 23. The PSA composition of any one of clauses 1 to 16 or 22 wherein the monoisocyanate (meth)acrylate is 2-isocyano-ethyl acrylate.

Clause 24. The PSA composition of any one of clauses 1 to 16 or 22 to 23 wherein the glycol is derived from the formula HO—R—OH in which R is a linear or branched alkylene radical containing from 2 to 20 carbon atoms or a cycloalkylene radical containing from 6 to 20 carbon atoms.

Clause 25. The PSA composition of any one of clauses 1 to 16 or 22 to 24 wherein the glycol is selected from the group consisting of poly(alkene oxide) glycols, alkoxylated amines, aliphatic glycols, ethylene glycol, propylene glycol, 1,3-propane-diol, 2-methyl-1,3-propane-diol, 2,2-dimethyl-1,3-propane-diol, 2-butyl-2-ethyl-1,3-propanediol, 2,2,4-trimethyl-1,3-pentane-diol, 1,6-hexane-diol, cyclohexanedimethanol, tricyclodecane dimethylol, hydrogenated Bisphenol A, alkoxylated BPA, trimethylol propane (TMP), glycerol, and combinations thereof.

Clause 26. The PSA composition of any one of clauses 1 to 16 or 22 to 25 wherein the glycol is selected from the group consisting of dimethylolpropionic acid (DMPA), 2-butyl-2-ethyl-1,3-propanediol (BEPD), trimethylol propane (TMP) and combinations thereof.

Clause 27. The PSA composition of clause 1 wherein the urethane (meth)acrylate oligomer is a reaction product of (iii).

Clause 28. The PSA composition of any one of clauses 1 to 16 or 27 wherein the diisocyanate is selected from the group consisting of isophorone diisocyanate (IPDI), toluene diisocyanate (TDI), and combinations thereof.

Clause 29. The PSA composition of any one of clauses 1 to 16 or 27 to 28 wherein the glycol is derived from the formula HO—R—OH in which R is a linear or branched alkylene radical containing from 2 to 20 carbon atoms or a cycloalkylene radical containing from 6 to 20 carbon atoms.

Clause 30. The PSA composition of any one of clauses 1 to 16 or 27 to 29 wherein the glycol is selected from the group consisting of poly(alkene oxide) glycols, alkoxylated amines, aliphatic glycols, ethylene glycol, propylene glycol, 1,3-propane-diol, 2-methyl-1,3-propane-diol, 2,2-dimethyl-1,3-propane-diol, 2-butyl-2-ethyl-1,3-propanediol, 2,2,4-trimethyl-1,3-pentane-diol, 1,6-hexane-diol, cyclohexanedimethanol, tricyclodecane dimethylol, hydrogenated Bisphenol A, alkoxylated BPA, trimethylol propane (TMP), glycerol, and combinations thereof.

Clause 31. The PSA composition of any one of clauses 1 to 16 or 27 to 30 wherein the glycol is dimethylolpropionic acid (DMPA), 2-butyl-2-ethyl-1,3-propanediol (BEPD), trimethylol propane (TMP) and combinations thereof.

Clause 32. The PSA composition of any one of clauses 1 to 16 or 27 to 31 wherein the hydroxy functional (meth)acrylate is selected from the group consisting of hydroxypropyl acrylate (HPA), hydroxyethyl acrylate (HEA), hydroxybutyl acrylate (HBA), and combinations thereof.

Clause 33. The PSA composition of any one of clauses 1 to 16 or 27 to 31 wherein the hydroxy functional (meth)acrylate is selected from the group consisting of hydroxypropyl methacrylate, hydroxyethyl methacrylate, hydroxybutyl methacrylate, and combinations thereof.

Clause 34. The PSA composition of any one of clauses 1 to 33 wherein the urethane (meth)acrylate oligomer is present in the PSA, prior to curing, at a weight proportion in a range of from 1% to 60%.

Clause 35. The PSA composition of any one of clauses 1 to 34 wherein the weight proportion is from 10% to 50%.

Clause 36. The PSA composition of any one of clauses 1 to 35 further comprising: at least one curing agent.

Clause 37. The PSA composition of any one of clauses 1 to 36 wherein the curing agent is a thermal cure agent.

Clause 38. The PSA composition of any one of clauses 1 to 37 wherein the thermal cure agent exhibits an activation temperature within a range of from 60° C. to 150° C.

Clause 39. The PSA composition of any one of clauses 1 to 36 wherein the curing agent is a radiation cure agent.

Clause 40. The PSA composition of any one of claims 1 to 39 wherein the curing agent is present in the PSA, prior to curing, at a weight proportion in a range of from 0.1% to 10%.

Clause 41. The PSA composition of any one of clauses 1 to 40 further comprising: an epoxy agent selected from the group consisting of a monofunctional epoxy, a multifunctional epoxy, and combinations thereof.

Clause 42. The PSA composition of any one of clauses 1 to 41 wherein the epoxy agent is present in the PSA, prior to curing, at a weight proportion in a range of from 0.1% to 60%.

Clause 43. The PSA composition of any one of clauses 1 to 42 wherein the epoxy agent is selected from the group consisting of aromatic epoxy resins, aliphatic epoxy resins, cycloaliphatic epoxy resins, and combinations thereof.

Clause 44. The PSA composition of any one of clauses 1 to 43 wherein the epoxy agent is selected from the group consisting of bisphenol A epoxy resins, bisphenol F epoxy resins, novolac epoxy resins, aliphatic epoxy resins, glycidylamine epoxy resins, and combinations thereof.

Clause 45. The PSA composition of any one of clauses 1 to 44 wherein the epoxy agent is selected from the group consisting of bisphenol A resins, bisphenol F resins, and phenol-formaldehyde novolacs, polyglycidylether of polyols, polyglycidylesters of polycarboxylic acids, derivatives of epoxidized polyunsaturated oils, epoxidized unsaturated cyclic compounds, and combinations thereof.

Clause 46. The PSA composition of any one of clauses 1 to 45 further comprising: adhesion promoters including at least one of (i) an epoxy phosphate ester, (ii) a blend of an epoxy agent and phosphoric acid, (iii) (poly)(meth)acrylated phosphates, and (iv) (meth)acrylated siloxane.

Clause 47. The PSA composition of any one of clauses 1 to 46 wherein the total weight proportion of the adhesion promoters in the PSA prior to curing, is within a range of from 0.01% to 10%.

Clause 48. The PSA composition of any one of clauses 1 to 47 further comprising: at least one functional additive.

Clause 49. The PSA composition of any one of clauses 1 to 48 wherein after conversion to the structural adhesive, the adhesive exhibits a lap shear strength of at least 350 psi.

Clause 50. A method of preparing a convertible pressure sensitive adhesive (PSA) composition, that upon conversion forms a structural adhesive, the method comprising: providing an acrylic PSA resin; providing at least one urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate, wherein the urethane (meth)acrylate oligomer has a weight average molecular weight (Mw) of less than 3,000 g/mol; blending the acrylic PSA resin with the urethane (meth)acrylate oligomer.

Clause 51. The method of clause 50 further comprising: providing at least one curing agent; wherein the blending includes blending the curing agent with the acrylic PSA resin and the urethane (meth)acrylate oligomer.

Clause 52. The method of clauses 51 wherein the curing agent includes a thermal cure agent.

Clause 53. The method of clause 51 wherein the curing agent is a radiation cure agent.

Clause 54. A method of forming a structural adhesive, the method comprising: providing a convertible pressure sensitive adhesive (PSA) composition including an acrylic PSA resin, a urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate, wherein the urethane (meth)acrylate oligomer has a weight average molecular weight (Mw) of less than 3,000 g/mol; and at least one curing agent; subjecting the convertible PSA to conditions causing adhesive cure to thereby form the structural adhesive.

Clause 55. The method of clause 54 wherein the curing agent includes a thermal cure agent and the subjecting to conditions includes heating the adhesive.

Clause 56. The method of clause 55 wherein heating is performed such that the adhesive is heated to at least 60° C.

Clause 57. The method of clause 54 wherein the curing agent includes a radiation cure agent and the subjecting to conditions includes exposing the adhesive to radiation.

Clause 58. The method of clause 57 wherein the radiation is selected from the group consisting of UV radiation and actinic radiation.

Clause 59. A convertible pressure sensitive adhesive (PSA) composition, that upon conversion forms a structural adhesive, the PSA composition consists of: an acrylic PSA resin; and a urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate, wherein the urethane (meth)acrylate oligomer has a weight average molecular weight (Mw) of less than 3,000 g/mol.

Clause 60. A convertible pressure sensitive adhesive (PSA) composition, that upon conversion forms a structural adhesive, the PSA composition consists of: an acrylic PSA resin; a urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate; and at least one curing agent, wherein the urethane (meth)acrylate oligomer has a weight average molecular weight (Mw) of less than 3,000 g/mol.

Clause 61. A convertible pressure sensitive adhesive (PSA) composition, that upon conversion forms a structural adhesive, the PSA composition consists of: an acrylic PSA resin; a urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate; at least one curing agent; and a multifunctional epoxy agent, wherein the urethane (meth)acrylate oligomer has a weight average molecular weight (Mw) of less than 3,000 g/mol.

Clause 62. A convertible pressure sensitive adhesive (PSA) composition, that upon conversion forms a structural adhesive, the PSA composition consists of: an acrylic PSA resin; a urethane (meth)acrylate oligomer which is a reaction product of one of: (i) a polyisocyanate and a hydroxy functional (meth)acrylate, (ii) a monoisocyanate (meth)acrylate and a glycol, (iii) a diisocyanate, a glycol, and a hydroxy functional (meth)acrylate; at least one curing agent; a multifunctional epoxy agent; and at least one of (i) an epoxy phosphate ester, (ii) a blend of an epoxy agent and phosphoric acid, (iii) (poly)acrylated phosphates, and (iv) (meth)acrylated siloxane, wherein the urethane (meth)acrylate oligomer has a weight average molecular weight (Mw) of less than 3,000 g/mol.

Clause 63. The PSA composition of any one of clauses 1 to 49 wherein the acrylic PSA resin includes an ordered polymer comprising at least two different blocks, including one or more blocks A placed at a first region within the polymer and one or more blocks B placed at a second region within the polymer, and at least one reactive functional group apportioned between the blocks A and B wherein an amount of the at least one reactive functional group in both blocks A and B is apportioned between the blocks A and B in an apportionment ratio of from about 1:1 to about 10,000:1.

Clause 64. The PSA composition of any one of clauses 1 to 49 wherein the acrylic PSA resin includes an acrylic copolymer comprising at least one acrylic block copolymer including a first reactive segment of controlled molecular weight and position that includes at least one monomer having a functional group selected from the group consisting of a UV active functional group, a reactive functional group, a non-reactive functional group, and combinations thereof; and a second segment of controlled molecular weight and position that includes at least one monomer having a functional group selected from the group consisting of a reactive functional group, a non-reactive functional group, and combinations thereof.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A convertible pressure sensitive adhesive (PSA) composition, that upon conversion forms a structural adhesive, the PSA composition comprising:
    an acrylic PSA, having a glass transition temperature (Tg) from about −70° C. to about 30° C., admixed with;
    a urethane (meth)acrylate oligomer which is a reaction product of one of:
        (i) a polyisocyanate and a hydroxy functional (meth)acrylate,
        (ii) a monoisocyanate (meth)acrylate and a glycol,
        (iii) a diisocyanate, a glycol, and a hydroxy functional (meth)acrylate,
    wherein the urethane (meth)acrylate oligomer has a weight average molecular weight (Mw) of less than 3,000 g/mol.

2. The PSA composition of claim 1 wherein the acrylic PSA resin has a weight average molecular weight (Mw) in the range of from about 100,000 g/mol to about 1,000,000 g/mol.

3. The PSA composition of claim 1 wherein the acrylic PSA includes an acid functional group.

4. The PSA composition of claim 1 wherein the acrylic PSA is present in the PSA, prior to curing, at a weight proportion in a range of from 30% to 95%.

5. The PSA composition of claim 1 wherein the acrylic PSA is formed using a controlled radical polymerization process.

6. The PSA composition of claim 1 wherein the acrylic PSA includes at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxy, alkoxymethylol, silane (siloxy), oxazole, cyclic ether groups.

7. The PSA composition of claim 1 wherein the urethane (meth)acrylate oligomer has a weight average molecular weight (Mw) less than 2,000 g/mol.

8. The PSA composition of claim 1 wherein the urethane (meth)acrylate oligomer has an average molecular weight between crosslinks (Mc) in the range of from about 200 g/mol to about 1250 g/mol.

9. The PSA composition of claim 1 wherein the urethane (meth)acrylate oligomer has a glass transition temperature (Tg) in the range of from about 0° C. to about 200° C.

10. The PSA composition of claim 1 wherein the urethane (meth)acrylate oligomer is a solid at room temperature.

11. The PSA composition of claim 1 wherein the urethane (meth)acrylate oligomer includes an acid functional group.

12. The PSA composition of claim 1 wherein the urethane (meth)acrylate oligomer is selected from the group consisting of a monofunctional urethane (meth)acrylate oligomer, a multifunctional urethane (meth)acrylate oligomer, and combinations thereof.

13. The PSA composition of claim 12 wherein the functionality of the urethane (meth)acrylate oligomer is from 2 to 5.

14. The PSA composition of claim 1 wherein the urethane (meth)acrylate oligomer includes at least one functional group selected from the group consisting of hydroxyl, carboxyl, acidic, epoxy, silane (siloxy), and acetoacetoxy.

15. The PSA composition of claim 1 wherein prior to conversion to the structural adhesive, the PSA composition is a homogeneous solution.

16. The PSA composition of claim 1 wherein the urethane (meth)acrylate oligomer is a reaction product of (i).

17. The PSA composition of claim 16 wherein the polyisocyanate is derived from a diisocyanate selected from the group consisting of isophorone diisocyanate (IPDI), toluene diisocyanate (TDI), and combinations thereof.

18. The PSA composition of claim 16 wherein the hydroxy functional (meth)acrylate includes at least one of (i) $C_1$-$C_{20}$ alkyl (meth)acrylate, (ii) $C_1$-$C_{20}$ aryl (meth)acrylate, and (iii) $C_1$-$C_{20}$ (meth)acrylate.

19. The PSA composition of claim 16 wherein the hydroxy functional (meth)acrylate is selected from the group consisting of hydroxypropyl acrylate (HPA), hydroxyethyl acrylate (HEA), hydroxybutyl acrylate (HBA), and combinations thereof.

20. The PSA composition of claim 16 wherein the hydroxy functional (meth)acrylate is selected from the group consisting of hydroxypropyl methacrylate, hydroxyethyl methacrylate, hydroxybutyl methacrylate, and combinations thereof.

21. The PSA composition of claim 1 wherein the urethane (meth)acrylate oligomer is a reaction product of (ii).

22. The PSA composition of claim 21 wherein the monoisocyanate (meth)acrylate is 2-isocyano-ethyl acrylate.

23. The PSA composition of claim 21 wherein the glycol is derived from the formula HO—R—OH in which R is a linear or branched alkylene radical containing from 2 to 20 carbon atoms or a cycloalkylene radical containing from 6 to 20 carbon atoms.

24. The PSA composition of claim 21 wherein the glycol is selected from the group consisting of poly(alkene oxide) glycols, alkoxylated amines, aliphatic glycols, ethylene glycol, propylene glycol, 1,3-propane-diol, 2-methyl-1,3-propane-diol, 2,2-dimethyl-1,3-propane-diol, 2-butyl-2-ethyl-1,3-propanediol, 2,2,4-trimethyl-1,3-pentane-diol, 1,6-hexane-diol, cyclohexanedimethanol, tricyclodecane dimethylol, hydrogenated Bisphenol A, alkoxylated BPA, trimethylol propane (TMP), glycerol, and combinations thereof.

25. The PSA composition of claim 21 wherein the glycol is selected from the group consisting of dimethylolpropionic acid (DMPA), 2-butyl-2-ethyl-1,3-propanediol (BEPD), trimethylol propane (TMP) and combinations thereof.

26. The PSA composition of claim 1 wherein the urethane (meth)acrylate oligomer is a reaction product of (iii).

27. The PSA composition of claim 26 wherein the diisocyanate is selected from the group consisting of isophorone diisocyanate (IPDI), toluene diisocyanate (TDI), and combinations thereof.

28. The PSA composition of claim 26 wherein the glycol is derived from the formula HO—R—OH in which R is a linear or branched alkylene radical containing from 2 to 20 carbon atoms or a cycloalkylene radical containing from 6 to 20 carbon atoms.

29. The PSA composition of claim 26 wherein the glycol is selected from the group consisting of poly(alkene oxide) glycols, alkoxylated amines, aliphatic glycols, ethylene glycol, propylene glycol, 1,3-propane-diol, 2-methyl-1,3-propane-diol, 2,2-dimethyl-1,3-propane-diol, 2-butyl-2-ethyl-1,3-propanediol, 2,2,4-trimethyl-1,3-pentane-diol, 1,6-hexane-diol, cyclohexanedimethanol, tricyclodecane dimethylol, hydrogenated Bisphenol A, alkoxylated BPA, trimethylol propane (TMP), glycerol, and combinations thereof.

30. The PSA composition of claim 26 wherein the glycol is dimethylolpropionic acid (DMPA), 2-butyl-2-ethyl-1,3-propanediol (BEPD), trimethylol propane (TMP) and combinations thereof.

31. The PSA composition of claim 26 wherein the hydroxy functional (meth)acrylate is selected from the group consisting of hydroxypropyl acrylate (HPA), hydroxyethyl acrylate (HEA), hydroxybutyl acrylate (HBA), and combinations thereof.

32. The PSA composition of claim 26 wherein the hydroxy functional (meth)acrylate is selected from the group consisting of hydroxypropyl methacrylate, hydroxyethyl methacrylate, hydroxybutyl methacrylate, and combinations thereof.

33. The PSA composition of claim 1 wherein the urethane (meth)acrylate oligomer is present in the PSA, prior to curing, at a weight proportion in a range of from 1% to 60%.

34. The PSA composition of claim 33 wherein the weight proportion is from 10% to 50%.

35. The PSA composition of claim 1 further comprising: at least one curing agent.

36. The PSA composition of claim 35 wherein the curing agent is a thermal cure agent.

37. The PSA composition of claim 36 wherein the thermal cure agent exhibits an activation temperature within a range of from 60° C. to 150° C.

38. The PSA composition of claim 35 wherein the curing agent is a radiation cure agent.

39. The PSA composition of claim 35 wherein the curing agent is present in the PSA, prior to curing, at a weight proportion in a range of from 0.1% to 10%.

40. The PSA composition of claim 1 further comprising: an epoxy agent selected from the group consisting of a monofunctional epoxy, a multifunctional epoxy, and combinations thereof.

41. The PSA composition of claim 40 wherein the epoxy agent is present in the PSA, prior to curing, at a weight proportion in a range of from 0.1% to 60%.

42. The PSA composition of claim 40 wherein the epoxy agent is selected from the group consisting of aromatic epoxy resins, aliphatic epoxy resins, cycloaliphatic epoxy resins, and combinations thereof.

43. The PSA composition of claim 40 wherein the epoxy agent is selected from the group consisting of bisphenol A epoxy resins, bisphenol F epoxy resins, novolac epoxy resins, aliphatic epoxy resins, glycidylamine epoxy resins, and combinations thereof.

44. The PSA composition of claim 40 wherein the epoxy agent is selected from the group consisting of bisphenol A resins, bisphenol F resins, and phenol-formaldehyde novolacs, polyglycidylether of polyols, polyglycidylesters of polycarboxylic acids, derivatives of epoxidized polyunsaturated oils, epoxidized unsaturated cyclic compounds, and combinations thereof.

45. The PSA composition of claim 1 further comprising: adhesion promoters including at least one of (i) an epoxy phosphate ester, (ii) a blend of an epoxy agent and phosphoric acid, (iii) (poly)(meth)acrylated phosphates, and (iv) (meth)acrylated siloxane.

46. The PSA composition of claim 45 wherein the total weight proportion of the adhesion promoters in the PSA prior to curing, is within a range of from 0.01% to 10%.

47. The PSA composition of claim 1 further comprising: at least one functional additive.

48. The PSA composition of claim 1 wherein after conversion to the structural adhesive, the adhesive exhibits a lap shear strength of at least 350 psi.

49. A method of preparing a convertible pressure sensitive adhesive (PSA) composition, that upon conversion forms a structural adhesive, the method comprising:
providing an acrylic PSA, having a glass transition temperature (Tg) from about −70° C. to about 30° C.;
providing at least one urethane (meth)acrylate oligomer which is a reaction product of one of:
(i) a polyisocyanate and a hydroxy functional (meth)acrylate,
(ii) a monoisocyanate (meth)acrylate and a glycol,
(iii) a diisocyanate, a glycol, and a hydroxy functional (meth)acrylate,
wherein the urethane (meth)acrylate oligomer has a weight average molecular weight (Mw) less than 3,000 g/mol;
blending the acrylic PSA with the urethane (meth)acrylate oligomer.

50. The method of claim 49 further comprising:
providing at least one curing agent;
wherein the blending includes blending the curing agent with the acrylic PSA and the urethane (meth)acrylate oligomer.

51. The method of claim 50 wherein the curing agent includes a thermal cure agent.

52. The method of claim 50 wherein the curing agent is a radiation cure agent.

53. A method of forming a structural adhesive, the method comprising:
providing a convertible pressure sensitive adhesive (PSA) composition comprising an acrylic PSA, having a glass transition temperature (Tg) from about −70° C. to about 30° C., admixed with a urethane (meth)acrylate oligomer which is a reaction product of one of:
(i) a polyisocyanate and a hydroxy functional (meth)acrylate,
(ii) a monoisocyanate (meth)acrylate and a glycol,
(iii) a diisocyanate, a glycol, and a hydroxy functional (meth)acrylate,
wherein the urethane (meth)acrylate oligomer has a weight average molecular weight (Mw) less than 3,000 g/mol;
and at least one curing agent;
subjecting the convertible PSA to conditions causing adhesive cure to thereby form the structural adhesive.

54. The method of claim 53 wherein the curing agent includes a thermal cure agent and the subjecting to conditions includes heating the adhesive.

55. The method of claim 54 wherein heating is performed such that the adhesive is heated to at least 60° C.

56. The method of claim 53 wherein the curing agent includes a radiation cure agent and the subjecting to conditions includes exposing the adhesive to radiation.

57. The method of claim 56 wherein the radiation is selected from the group consisting of UV radiation and actinic radiation.

58. The PSA composition of claim 1 wherein the acrylic PSA includes an ordered polymer comprising at least two different blocks, including one or more blocks A placed at a first region within the polymer and one or more blocks B placed at a second region within the polymer, and at least one reactive functional group apportioned between the blocks A and B wherein an amount of the at least one reactive functional group in both blocks A and B is apportioned between the blocks A and B in an apportionment ratio of from about 1:1 to about 10,000:1.

59. The PSA composition of claim 1 wherein the acrylic PSA includes an acrylic copolymer comprising
at least one acrylic block copolymer including
a first reactive segment of controlled molecular weight and position that includes at least one monomer having a functional group selected from the group consisting of a UV active functional group, a reactive functional group, a non-reactive functional group, and combinations thereof; and
a second segment of controlled molecular weight and position that includes at least one monomer having a functional group selected from the group consisting of a reactive functional group, a non-reactive functional group, and combinations thereof.

60. The PSA composition of claim 1, wherein the composition consists of
an acrylic PSA; and
a urethane (meth)acrylate oligomer which is a reaction product of one of:
(i) a polyisocyanate and a hydroxy functional (meth)acrylate,
(ii) a monoisocyanate (meth)acrylate and a glycol,
(iii) a diisocyanate, a glycol, and a hydroxy functional (meth)acrylate,
wherein the urethane (meth)acrylate oligomer has a weight average molecular weight (Mw) of less than 3,000 g/mol.

61. The PSA composition of claim 1, wherein the PSA composition consists of:
an acrylic PSA;
a urethane (meth)acrylate oligomer which is a reaction product of one of:
(i) a polyisocyanate and a hydroxy functional (meth)acrylate,
(ii) a monoisocyanate (meth)acrylate and a glycol,
(iii) a diisocyanate, a glycol, and a hydroxy functional (meth)acrylate; and
at least one curing agent,
wherein the urethane (meth)acrylate oligomer has a weight average molecular weight (Mw) of less than 3,000 g/mol.

62. The PSA composition of claim 1, wherein the PSA composition consists of:
an acrylic PSA;
a urethane (meth)acrylate oligomer which is a reaction product of one of:
(i) a polyisocyanate and a hydroxy functional (meth)acrylate,
(ii) a monoisocyanate (meth)acrylate and a glycol, (iii) a diisocyanate, a glycol, and a hydroxy functional (meth)acrylate;

at least one curing agent; and a multifunctional epoxy agent, wherein the urethane (meth)acrylate oligomer has a weight average molecular weight (Mw) of less than 3,000 g/mol.

63. The PSA composition of claim 1, wherein the PSA composition consists of:

an acrylic PSA;

a urethane (meth)acrylate oligomer which is a reaction product of one of:

(i) a polyisocyanate and a hydroxy functional (meth)acrylate, (ii) a monoisocyanate (meth)acrylate and a glycol, (iii) a diisocyanate, a glycol, and a hydroxy functional (meth)acrylate;

at least one curing agent;

a multifunctional epoxy agent; and at least one of (i) an epoxy phosphate ester, (ii) a blend of an epoxy agent and phosphoric acid, (iii) (poly)acrylated phosphates, and (iv) (meth)acrylated siloxane, wherein the urethane (meth)acrylate oligomer has a weight average molecular weight (Mw) of less than 3,000 g/mol.

64. The PSA composition of claim 1, wherein the acrylic PSA resin, prior to cure, exhibits tackiness at a temperature from about 15° C. to about 30° C. and bonds to a surface upon application of light pressure.

65. The PSA composition of claim 49, wherein the acrylic PSA resin, prior to cure, exhibits tackiness at a temperature from about 15° C. to about 30° C. and bonds to a surface upon application of light pressure.

66. The PSA composition of claim 53, wherein the acrylic PSA resin, prior to cure, exhibits tackiness at a temperature from about 15° C. to about 30° C. and bonds to a surface upon application of light pressure.

* * * * *